US008852050B2

(12) United States Patent
Thomassy

(10) Patent No.: US 8,852,050 B2
(45) Date of Patent: Oct. 7, 2014

(54) CONTINUOUSLY VARIABLE TRANSMISSION

(71) Applicant: Fallbrook Intellectual Property Company LLC, Cedar Park, TX (US)

(72) Inventor: Fernand A Thomassy, Liberty Hill, TX (US)

(73) Assignee: Fallbrook Intellectual Property Company LLC, Cedar Park, TX (US)

( * ) Notice: Subject to any disclaimer, the term of this patent is extended or adjusted under 35 U.S.C. 154(b) by 0 days.

(21) Appl. No.: 13/924,304

(22) Filed: Jun. 21, 2013

(65) Prior Publication Data

US 2013/0288844 A1    Oct. 31, 2013

Related U.S. Application Data

(63) Continuation of application No. 12/198,402, filed on Aug. 26, 2008, now Pat. No. 8,469,856.

(51) Int. Cl.
*F16H 15/38* (2006.01)
*F16H 15/52* (2006.01)
*F16H 15/28* (2006.01)
*F16H 15/50* (2006.01)

(52) U.S. Cl.
CPC .............. *F16H 15/503* (2013.01); *F16H 15/52* (2013.01); *F16H 15/28* (2013.01)
USPC ............................................... 476/40; 476/10

(58) Field of Classification Search
USPC .......................... 476/40, 41, 42, 43, 44, 46, 10
See application file for complete search history.

(56) References Cited

U.S. PATENT DOCUMENTS 719,595 A    2/1903    Huss
1,121,210 A   12/1914    Techel
(Continued)

FOREIGN PATENT DOCUMENTS

CH    118064    12/1926
CN   1054340     9/1991
(Continued)

OTHER PUBLICATIONS

International Search Report and Written Opinion dated Feb. 2, 2010 from International Patent Application No. PCT/US2008/068929, filed on Jan. 7, 2008.

(Continued)

*Primary Examiner* — David M Fenstermacher
(74) *Attorney, Agent, or Firm* — Knobbe Martens Olson & Bear LLP

(57) ABSTRACT

Components, subassemblies, systems, and/or methods for continuously variable transmissions (CVT) having a control system adapted to facilitate a change in the ratio of a CVT are provided. In one embodiment, a control system includes a stator plate configured to have a plurality of radially offset slots. Various traction planet assemblies and stator plates can be used to facilitate shifting the ratio of a CVT. In some embodiments, the traction planet assemblies include planet axles configured to cooperate with the stator plate. In one embodiment, the stator plate is configured to rotate and apply a skew condition to each of the planet axles. In some embodiments, a stator driver is operably coupled to the stator plate. Embodiments of a traction sun are adapted to cooperate with other components of the CVT to support operation and/or functionality of the CVT.

8 Claims, 15 Drawing Sheets

(56) References Cited

U.S. PATENT DOCUMENTS

| | | |
|---|---|---|
| 1,175,677 A | 3/1916 | Barnes |
| 1,207,985 A | 12/1916 | Null et al. |
| 1,380,006 A | 5/1921 | Nielson |
| 1,390,971 A | 9/1921 | Samain |
| 1,558,222 A | 10/1925 | Beetow |
| 1,629,902 A | 5/1927 | Arter et al. |
| 1,686,446 A | 10/1928 | Gilman |
| 1,774,254 A | 8/1930 | Daukus |
| 1,793,571 A | 2/1931 | Vaughn |
| 1,847,027 A | 2/1932 | Thomsen et al. |
| 1,850,189 A | 3/1932 | Weiss |
| 1,858,696 A | 5/1932 | Weiss |
| 1,865,102 A | 6/1932 | Hayes |
| 1,903,228 A | 3/1933 | Thomson |
| 1,978,439 A | 10/1934 | Sharpe |
| 2,030,203 A | 2/1936 | Gove et al. |
| 2,060,884 A | 11/1936 | Madle |
| 2,086,491 A | 7/1937 | Dodge |
| 2,100,629 A | 11/1937 | Chilton |
| 2,109,845 A | 3/1938 | Madle |
| 2,112,763 A | 3/1938 | Cloudsley |
| 2,134,225 A | 10/1938 | Christiansen |
| 2,152,796 A | 4/1939 | Erban |
| 2,196,064 A | 4/1940 | Erban |
| 2,209,254 A | 7/1940 | Ahnger |
| 2,259,933 A | 10/1941 | Holloway |
| 2,269,434 A | 1/1942 | Brooks |
| 2,325,502 A | 7/1943 | Auguste |
| RE22,761 E | 5/1946 | Wemp |
| 2,461,258 A | 2/1949 | Brooks |
| 2,469,653 A | 5/1949 | Kopp |
| 2,480,968 A | 9/1949 | Ronai |
| 2,596,538 A | 5/1952 | Dicke |
| 2,597,849 A | 5/1952 | Alfredeen |
| 2,675,713 A | 4/1954 | Acker |
| 2,730,904 A | 1/1956 | Rennerfelt |
| 2,748,614 A | 6/1956 | Weisel |
| 2,868,038 A | 1/1959 | Billeter |
| 2,959,070 A | 1/1959 | Flinn |
| 2,874,592 A | 2/1959 | Oehrli |
| 2,883,883 A | 4/1959 | Chillson |
| 2,891,213 A | 6/1959 | Kern |
| 2,913,932 A | 11/1959 | Oehru |
| 2,931,234 A | 4/1960 | Hayward |
| 2,931,235 A | 4/1960 | Hayward |
| 2,949,800 A | 8/1960 | Neuschotz |
| 2,959,063 A | 11/1960 | Perry |
| 2,959,972 A | 11/1960 | Madson |
| 2,964,959 A | 12/1960 | Beck |
| 3,008,061 A | 11/1961 | Mims et al. |
| 3,048,056 A | 8/1962 | Wolfram |
| 3,051,020 A | 8/1962 | Hartupee |
| 3,086,704 A | 4/1963 | Hurtt |
| 3,087,348 A | 4/1963 | Kraus |
| 3,154,957 A | 11/1964 | Kashihara |
| 3,163,050 A | 12/1964 | Kraus |
| 3,176,542 A | 4/1965 | Monch |
| 3,184,983 A | 5/1965 | Kraus |
| 3,204,476 A | 9/1965 | Rouverol |
| 3,209,606 A | 10/1965 | Yamamoto |
| 3,211,364 A | 10/1965 | Wentling et al. |
| 3,216,283 A | 11/1965 | General |
| 3,246,531 A | 4/1966 | Kashihara |
| 3,248,960 A | 5/1966 | Schottler |
| 3,273,468 A | 9/1966 | Allen |
| 3,280,646 A | 10/1966 | Lemieux |
| 3,292,443 A | 12/1966 | Felix |
| 3,340,895 A | 9/1967 | Osgood, Jr. et al. |
| 3,407,687 A | 10/1968 | Hayashi |
| 3,440,895 A | 4/1969 | Fellows |
| 3,464,281 A | 9/1969 | Hiroshi et al. |
| 3,477,315 A | 11/1969 | Macks |
| 3,487,726 A | 1/1970 | Burnett |
| 3,487,727 A | 1/1970 | Gustafsson |
| 3,574,289 A | 4/1971 | Scheiter et al. |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz et al. |
| 3,768,715 A | 10/1973 | Tout |
| 3,800,607 A | 4/1974 | Zurcher |
| 3,802,284 A | 4/1974 | Sharpe et al. |
| 3,810,398 A | 5/1974 | Kraus |
| 3,820,416 A | 6/1974 | Kraus |
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,987,681 A | 10/1976 | Keithley et al. |
| 3,996,807 A | 12/1976 | Adams |
| 4,098,146 A | 7/1978 | McLarty |
| 4,103,514 A | 8/1978 | Grosse-Entrup |
| 4,159,653 A | 7/1979 | Koivunen |
| 4,169,609 A | 10/1979 | Zampedro |
| 4,177,683 A | 12/1979 | Moses |
| 4,227,712 A | 10/1980 | Dick |
| 4,314,485 A | 2/1982 | Adams |
| 4,345,486 A | 8/1982 | Olesen |
| 4,369,667 A | 1/1983 | Kemper |
| 4,382,188 A | 5/1983 | Cronin |
| 4,391,156 A | 7/1983 | Tibbals |
| 4,459,873 A | 7/1984 | Black |
| 4,464,952 A | 8/1984 | Stubbs |
| 4,468,984 A | 9/1984 | Castelli et al. |
| 4,494,524 A | 1/1985 | Wagner |
| 4,496,051 A | 1/1985 | Ortner |
| 4,526,255 A | 7/1985 | Hennessey et al. |
| 4,546,673 A | 10/1985 | Shigematsu et al. |
| 4,560,369 A | 12/1985 | Hattori |
| 4,574,649 A | 3/1986 | Seol |
| 4,585,429 A | 4/1986 | Marier |
| 4,630,839 A | 12/1986 | Seol |
| 4,631,469 A | 12/1986 | Tsuboi et al. |
| 4,651,082 A | 3/1987 | Kaneyuki |
| 4,700,581 A | 10/1987 | Tibbals, Jr. |
| 4,713,976 A | 12/1987 | Wilkes |
| 4,717,368 A | 1/1988 | Yamaguchi et al. |
| 4,735,430 A | 4/1988 | Tomkinson |
| 4,738,164 A | 4/1988 | Kaneyuki |
| 4,744,261 A | 5/1988 | Jacobson |
| 4,756,211 A | 7/1988 | Fellows |
| 4,781,663 A | 11/1988 | Reswick |
| 4,838,122 A | 6/1989 | Takamiya et al. |
| 4,856,374 A | 8/1989 | Kreuzer |
| 4,869,130 A | 9/1989 | Wiecko |
| 4,881,925 A | 11/1989 | Hattori |
| 4,900,046 A | 2/1990 | Aranceta-Angoitia |
| 4,909,101 A | 3/1990 | Terry |
| 4,918,344 A | 4/1990 | Chikamori et al. |
| 4,964,312 A | 10/1990 | Kraus |
| 5,006,093 A | 4/1991 | Itoh et al. |
| 5,020,384 A | 6/1991 | Kraus |
| 5,033,322 A | 7/1991 | Nakano |
| 5,037,361 A | 8/1991 | Takahashi |
| 5,069,655 A | 12/1991 | Schievelbusch |
| 5,121,654 A | 6/1992 | Fasce |
| 5,125,677 A | 6/1992 | Ogilvie et al. |
| 5,138,894 A | 8/1992 | Kraus |
| 5,156,412 A | 10/1992 | Meguerditchian |
| 5,230,258 A | 7/1993 | Nakano |
| 5,236,211 A | 8/1993 | Meguerditchian |
| 5,236,403 A | 8/1993 | Schievelbusch |
| 5,267,920 A | 12/1993 | Hibi |
| 5,273,501 A | 12/1993 | Schievelbusch |
| 5,318,486 A | 6/1994 | Lutz |
| 5,319,486 A | 6/1994 | Vogel et al. |
| 5,330,396 A | 7/1994 | Lohr et al. |
| 5,355,749 A | 10/1994 | Obara et al. |
| 5,375,865 A | 12/1994 | Terry, Sr. |
| 5,379,661 A | 1/1995 | Nakano |
| 5,383,677 A | 1/1995 | Thomas |
| 5,387,000 A | 2/1995 | Sato |

(56) References Cited

U.S. PATENT DOCUMENTS

| | | | |
|---|---|---|---|
| 5,401,221 A | 3/1995 | Fellows et al. |
| 5,451,070 A | 9/1995 | Lindsay et al. |
| 5,489,003 A | 2/1996 | Ohyama et al. |
| 5,508,574 A | 4/1996 | Vlock |
| 5,562,564 A | 10/1996 | Folino |
| 5,564,998 A | 10/1996 | Fellows |
| 5,601,301 A | 2/1997 | Liu |
| 5,607,373 A | 3/1997 | Ochiai et al. |
| 5,645,507 A | 7/1997 | Hathaway |
| 5,651,750 A | 7/1997 | Imanishi et al. |
| 5,664,636 A | 9/1997 | Ikuma et al. |
| 5,690,346 A | 11/1997 | Keskitalo |
| 5,722,502 A | 3/1998 | Kubo |
| 5,746,676 A | 5/1998 | Kawase et al. |
| 5,755,303 A | 5/1998 | Yamamoto et al. |
| 5,799,541 A | 9/1998 | Arbeiter |
| 5,823,052 A | 10/1998 | Nobumoto |
| 5,846,155 A | 12/1998 | Taniguchi et al. |
| 5,888,160 A | 3/1999 | Miyata et al. |
| 5,899,827 A | 5/1999 | Nakano et al. |
| 5,902,207 A | 5/1999 | Sugihara |
| 5,967,933 A | 10/1999 | Valdenaire |
| 5,984,826 A | 11/1999 | Nakano |
| 6,000,707 A | 12/1999 | Miller |
| 6,004,239 A | 12/1999 | Makino |
| 6,006,151 A | 12/1999 | Graf |
| 6,015,359 A | 1/2000 | Kunii |
| 6,019,701 A | 2/2000 | Mori et al. |
| 6,029,990 A | 2/2000 | Busby |
| 6,042,132 A | 3/2000 | Suenaga et al. |
| 6,045,477 A | 4/2000 | Schmidt |
| 6,045,481 A | 4/2000 | Kumagai |
| 6,053,833 A | 4/2000 | Masaki |
| 6,053,841 A | 4/2000 | Kolde et al. |
| 6,054,844 A | 4/2000 | Frank |
| 6,066,067 A | 5/2000 | Greenwood |
| 6,071,210 A | 6/2000 | Kato et al. |
| 6,076,846 A | 6/2000 | Clardy |
| 6,079,726 A | 6/2000 | Busby |
| 6,095,940 A | 8/2000 | Ai et al. |
| 6,099,431 A | 8/2000 | Hoge et al. |
| 6,113,513 A | 9/2000 | Itoh et al. |
| 6,119,539 A | 9/2000 | Papanicolaou |
| 6,119,800 A | 9/2000 | McComber |
| 6,159,126 A | 12/2000 | Oshidari |
| 6,171,210 B1 | 1/2001 | Miyata et al. |
| 6,174,260 B1 | 1/2001 | Tsukada et al. |
| 6,186,922 B1 | 2/2001 | Bursal et al. |
| 6,217,473 B1 | 4/2001 | Ueda et al. |
| 6,241,636 B1 | 6/2001 | Miller |
| 6,243,638 B1 | 6/2001 | Abo et al. |
| 6,251,038 B1 | 6/2001 | Ishikawa et al. |
| 6,258,003 B1 | 7/2001 | Hirano et al. |
| 6,261,200 B1 | 7/2001 | Miyata et al. |
| 6,311,113 B1 | 10/2001 | Danz et al. |
| 6,312,358 B1 | 11/2001 | Goi et al. |
| 6,322,475 B2 | 11/2001 | Miller |
| 6,325,386 B1 | 12/2001 | Shoge |
| 6,358,178 B1 | 3/2002 | Wittkopp |
| 6,375,412 B1 | 4/2002 | Dial |
| 6,390,945 B1 | 5/2002 | Young |
| 6,390,946 B1 | 5/2002 | Hibi et al. |
| 6,406,399 B1 | 6/2002 | Ai |
| 6,414,401 B1 | 7/2002 | Kuroda et al. |
| 6,419,608 B1 | 7/2002 | Miller |
| 6,425,838 B1 | 7/2002 | Matsubara et al. |
| 6,434,960 B1 | 8/2002 | Rousseau |
| 6,461,268 B1 | 10/2002 | Milner |
| 6,482,094 B2 | 11/2002 | Kefes |
| 6,492,785 B1 | 12/2002 | Kasten et al. |
| 6,494,805 B2 | 12/2002 | Ooyama et al. |
| 6,499,373 B2 | 12/2002 | Van Cor |
| 6,514,175 B2 | 2/2003 | Taniguchi et al. |
| 6,532,890 B2 | 3/2003 | Chen |
| 6,551,210 B2 | 4/2003 | Miller |
| 6,575,047 B2 | 6/2003 | Reik et al. |
| 6,659,901 B2 | 12/2003 | Sakai et al. |
| 6,672,418 B1 | 1/2004 | Makino |
| 6,676,559 B2 | 1/2004 | Miller |
| 6,679,109 B2 | 1/2004 | Gierling et al. |
| 6,682,432 B1 | 1/2004 | Shinozuka |
| 6,689,012 B2 | 2/2004 | Miller |
| 6,721,637 B2 | 4/2004 | Abe et al. |
| 6,723,016 B2 | 4/2004 | Sumi |
| 6,805,654 B2 | 10/2004 | Nishii |
| 6,849,020 B2 | 2/2005 | Sumi |
| 6,859,709 B2 | 2/2005 | Joe et al. |
| 6,931,316 B2 | 8/2005 | Joe et al. |
| 6,932,739 B2 | 8/2005 | Miyata et al. |
| 6,942,593 B2 | 9/2005 | Nishii et al. |
| 6,945,903 B2 | 9/2005 | Miller |
| 6,949,049 B2 | 9/2005 | Miller |
| 6,958,029 B2 | 10/2005 | Inoue |
| 6,991,575 B2 | 1/2006 | Inoue |
| 6,991,579 B2 | 1/2006 | Kobayashi et al. |
| 7,011,600 B2 | 3/2006 | Miller et al. |
| 7,011,601 B2 | 3/2006 | Miller |
| 7,014,591 B2 | 3/2006 | Miller |
| 7,029,418 B2 | 4/2006 | Taketsuna et al. |
| 7,032,914 B2 | 4/2006 | Miller |
| 7,036,620 B2 | 5/2006 | Miller et al. |
| 7,044,884 B2 | 5/2006 | Miller |
| 7,063,640 B2 | 6/2006 | Miller |
| 7,074,007 B2 | 7/2006 | Miller |
| 7,074,154 B2 | 7/2006 | Miller |
| 7,074,155 B2 | 7/2006 | Miller |
| 7,077,777 B2 | 7/2006 | Miyata et al. |
| 7,086,979 B2 | 8/2006 | Frenken |
| 7,086,981 B2 | 8/2006 | Ali et al. |
| 7,094,171 B2 | 8/2006 | Inoue |
| 7,111,860 B1 | 9/2006 | Grimaldos |
| 7,112,158 B2 | 9/2006 | Miller |
| 7,112,159 B2 | 9/2006 | Miller et al. |
| 7,125,297 B2 | 10/2006 | Miller et al. |
| 7,131,930 B2 | 11/2006 | Miller et al. |
| 7,140,999 B2 | 11/2006 | Miller |
| 7,147,586 B2 | 12/2006 | Miller et al. |
| 7,153,233 B2 | 12/2006 | Miller et al. |
| 7,156,770 B2 | 1/2007 | Miller |
| 7,160,220 B2 | 1/2007 | Shinojima et al. |
| 7,160,222 B2 | 1/2007 | Miller |
| 7,163,485 B2 | 1/2007 | Miller |
| 7,163,486 B2 | 1/2007 | Miller et al. |
| 7,166,052 B2 | 1/2007 | Miller et al. |
| 7,166,056 B2 | 1/2007 | Miller et al. |
| 7,166,057 B2 | 1/2007 | Miller et al. |
| 7,166,058 B2 | 1/2007 | Miller et al. |
| 7,169,076 B2 | 1/2007 | Miller et al. |
| 7,172,529 B2 | 2/2007 | Miller et al. |
| 7,175,564 B2 | 2/2007 | Miller |
| 7,175,565 B2 | 2/2007 | Miller et al. |
| 7,175,566 B2 | 2/2007 | Miller et al. |
| 7,192,381 B2 | 3/2007 | Miller et al. |
| 7,197,915 B2 | 4/2007 | Luh et al. |
| 7,198,582 B2 | 4/2007 | Miller et al. |
| 7,198,583 B2 | 4/2007 | Miller et al. |
| 7,198,584 B2 | 4/2007 | Miller et al. |
| 7,198,585 B2 | 4/2007 | Miller et al. |
| 7,201,693 B2 | 4/2007 | Miller et al. |
| 7,201,694 B2 | 4/2007 | Miller et al. |
| 7,201,695 B2 | 4/2007 | Miller et al. |
| 7,204,777 B2 | 4/2007 | Miller et al. |
| 7,214,159 B2 | 5/2007 | Miller et al. |
| 7,217,215 B2 | 5/2007 | Miller et al. |
| 7,217,216 B2 | 5/2007 | Inoue |
| 7,217,219 B2 | 5/2007 | Miller et al. |
| 7,217,220 B2 | 5/2007 | Careau et al. |
| 7,232,395 B2 | 6/2007 | Miller et al. |
| 7,234,873 B2 | 6/2007 | Kato et al. |
| 7,235,031 B2 | 6/2007 | Miller et al. |
| 7,238,136 B2 | 7/2007 | Miller et al. |
| 7,238,137 B2 | 7/2007 | Miller et al. |
| 7,238,138 B2 | 7/2007 | Miller et al. |
| 7,238,139 B2 | 7/2007 | Roethler et al. |

(56) References Cited

U.S. PATENT DOCUMENTS

| | | |
|---|---|---|
| 7,246,672 B2 | 7/2007 | Shirai et al. |
| 7,250,018 B2 | 7/2007 | Miller et al. |
| 7,261,663 B2 | 8/2007 | Miller et al. |
| 7,275,610 B2 | 10/2007 | Kuang et al. |
| 7,285,068 B2 | 10/2007 | Hosoi |
| 7,288,042 B2 | 10/2007 | Miller et al. |
| 7,288,043 B2 | 10/2007 | Shioiri et al. |
| 7,320,660 B2 | 1/2008 | Miller |
| 7,322,901 B2 | 1/2008 | Miller et al. |
| 7,343,236 B2 | 3/2008 | Wilson |
| 7,347,801 B2 | 3/2008 | Guenter et al. |
| 7,384,370 B2 | 6/2008 | Miller |
| 7,393,300 B2 | 7/2008 | Miller et al. |
| 7,393,302 B2 | 7/2008 | Miller |
| 7,393,303 B2 | 7/2008 | Miller |
| 7,395,731 B2 | 7/2008 | Miller et al. |
| 7,396,209 B2 | 7/2008 | Miller et al. |
| 7,402,122 B2 | 7/2008 | Miller |
| 7,410,443 B2 | 8/2008 | Miller |
| 7,419,451 B2 | 9/2008 | Miller |
| 7,422,541 B2 | 9/2008 | Miller |
| 7,422,546 B2 | 9/2008 | Miller et al. |
| 7,427,253 B2 | 9/2008 | Miller |
| 7,431,677 B2 | 10/2008 | Miller et al. |
| 7,452,297 B2 | 11/2008 | Miller et al. |
| 7,455,611 B2 | 11/2008 | Miller et al. |
| 7,455,617 B2 | 11/2008 | Miller et al. |
| 7,462,123 B2 | 12/2008 | Miller et al. |
| 7,462,127 B2 | 12/2008 | Miller et al. |
| 7,470,210 B2 | 12/2008 | Miller et al. |
| 7,481,736 B2 | 1/2009 | Miller et al. |
| 7,510,499 B2 | 3/2009 | Miller et al. |
| 7,540,818 B2 | 6/2009 | Miller et al. |
| 7,547,264 B2 | 6/2009 | Usoro |
| 7,574,935 B2 | 8/2009 | Rohs et al. |
| 7,591,755 B2 | 9/2009 | Petrzik et al. |
| 7,632,203 B2 | 12/2009 | Miller |
| 7,651,437 B2 | 1/2010 | Miller et al. |
| 7,654,928 B2 | 2/2010 | Miller et al. |
| 7,670,243 B2 | 3/2010 | Miller |
| 7,686,729 B2 | 3/2010 | Miller et al. |
| 7,727,101 B2 | 6/2010 | Miller |
| 7,727,107 B2 | 6/2010 | Miller |
| 7,727,108 B2 | 6/2010 | Miller et al. |
| 7,727,110 B2 | 6/2010 | Miller et al. |
| 7,727,115 B2 | 6/2010 | Serkh |
| 7,731,615 B2 | 6/2010 | Miller et al. |
| 7,762,919 B2 | 7/2010 | Smithson et al. |
| 7,762,920 B2 | 7/2010 | Smithson et al. |
| 7,785,228 B2 | 8/2010 | Smithson et al. |
| 7,828,685 B2 | 11/2010 | Miller |
| 7,837,592 B2 | 11/2010 | Miller |
| 7,871,353 B2 | 1/2011 | Nichols et al. |
| 7,882,762 B2 | 2/2011 | Armstrong et al. |
| 7,883,442 B2 | 2/2011 | Miller et al. |
| 7,885,747 B2 | 2/2011 | Miller et al. |
| 7,887,032 B2 | 2/2011 | Malone |
| 7,909,727 B2 | 3/2011 | Smithson et al. |
| 7,914,029 B2 | 3/2011 | Miller et al. |
| 7,959,533 B2 | 6/2011 | Nichols et al. |
| 7,963,880 B2 | 6/2011 | Smithson et al. |
| 7,967,719 B2 | 6/2011 | Smithson et al. |
| 7,976,426 B2 | 7/2011 | Smithson et al. |
| 8,066,613 B2 | 11/2011 | Smithson et al. |
| 8,066,614 B2 | 11/2011 | Miller et al. |
| 8,070,635 B2 | 12/2011 | Miller |
| 8,087,482 B2 | 1/2012 | Miles et al. |
| 8,123,653 B2 | 2/2012 | Smithson et al. |
| 8,133,149 B2 | 3/2012 | Smithson et al. |
| 8,142,323 B2 | 3/2012 | Tsuchiya et al. |
| 8,167,759 B2 | 5/2012 | Pohl et al. |
| 8,171,636 B2 | 5/2012 | Smithson et al. |
| 8,262,536 B2 | 9/2012 | Nichols et al. |
| 8,267,829 B2 | 9/2012 | Miller et al. |
| 8,313,404 B2 | 11/2012 | Carter et al. |
| 8,313,405 B2 | 11/2012 | Bazyn et al. |
| 8,317,650 B2 | 11/2012 | Nichols et al. |
| 8,317,651 B2 | 11/2012 | Lohr |
| 8,321,097 B2 | 11/2012 | Vasiliotis et al. |
| 8,342,999 B2 | 1/2013 | Miller |
| 8,360,917 B2 | 1/2013 | Nichols et al. |
| 8,376,903 B2 | 2/2013 | Pohl et al. |
| 8,382,637 B2 | 2/2013 | Tange |
| 8,393,989 B2 | 3/2013 | Pohl |
| 8,398,518 B2 | 3/2013 | Nichols et al. |
| 8,469,853 B2 | 6/2013 | Miller et al. |
| 8,480,529 B2 | 7/2013 | Pohl et al. |
| 8,496,554 B2 | 7/2013 | Pohl et al. |
| 8,506,452 B2 | 8/2013 | Pohl et al. |
| 8,535,199 B2 | 9/2013 | Lohr et al. |
| 8,550,949 B2 * | 10/2013 | Miller ......................... 475/149 |
| 8,585,528 B2 * | 11/2013 | Carter et al. .................. 475/192 |
| 8,622,866 B2 * | 1/2014 | Bazyn et al. .................. 475/196 |
| 8,628,443 B2 | 1/2014 | Miller et al. |
| 8,641,572 B2 | 2/2014 | Nichols et al. |
| 8,641,577 B2 | 2/2014 | Nichols et al. |
| 2001/0008192 A1 | 7/2001 | Morisawa |
| 2001/0041644 A1 | 11/2001 | Yasuoka et al. |
| 2001/0044361 A1 | 11/2001 | Taniguchi et al. |
| 2002/0019285 A1 | 2/2002 | Henzler |
| 2002/0028722 A1 | 3/2002 | Sakai et al. |
| 2002/0045511 A1 | 4/2002 | Geiberger et al. |
| 2002/0169051 A1 | 11/2002 | Oshidari |
| 2003/0015358 A1 | 1/2003 | Abe et al. |
| 2003/0015874 A1 | 1/2003 | Abe et al. |
| 2003/0022753 A1 | 1/2003 | Mizuno et al. |
| 2003/0036456 A1 | 2/2003 | Skrabs |
| 2003/0132051 A1 | 7/2003 | Nishii et al. |
| 2003/0216216 A1 | 11/2003 | Inoue et al. |
| 2003/0221892 A1 | 12/2003 | Matsumoto et al. |
| 2004/0058772 A1 | 3/2004 | Inoue et al. |
| 2004/0082421 A1 | 4/2004 | Wafzig |
| 2004/0119345 A1 | 6/2004 | Takano |
| 2004/0204283 A1 | 10/2004 | Inoue |
| 2004/0231331 A1 | 11/2004 | Iwanami et al. |
| 2004/0254047 A1 | 12/2004 | Frank et al. |
| 2005/0037876 A1 | 2/2005 | Unno et al. |
| 2005/0227809 A1 | 10/2005 | Bitzer et al. |
| 2006/0052204 A1 | 3/2006 | Eckert et al. |
| 2006/0084549 A1 | 4/2006 | Smithson et al. |
| 2006/0108956 A1 | 5/2006 | Clark |
| 2006/0111212 A9 | 5/2006 | Ai et al. |
| 2006/0180363 A1 | 8/2006 | Uchisasai |
| 2006/0223667 A1 | 10/2006 | Nakazeki |
| 2006/0234822 A1 | 10/2006 | Morscheck et al. |
| 2006/0276299 A1 | 12/2006 | Imanishi |
| 2007/0004552 A1 | 1/2007 | Matsudaira et al. |
| 2007/0004556 A1 | 1/2007 | Rohs et al. |
| 2007/0149342 A1 | 6/2007 | Guenter et al. |
| 2007/0155567 A1 | 7/2007 | Miller et al. |
| 2007/0193391 A1 | 8/2007 | Armstrong et al. |
| 2008/0032852 A1 | 2/2008 | Smithson et al. |
| 2008/0032854 A1 | 2/2008 | Smithson et al. |
| 2008/0039269 A1 | 2/2008 | Smithson et al. |
| 2008/0039273 A1 | 2/2008 | Smithson et al. |
| 2008/0039274 A1 | 2/2008 | Smithson et al. |
| 2008/0039276 A1 | 2/2008 | Smithson et al. |
| 2008/0081728 A1 | 4/2008 | Faulring et al. |
| 2008/0139363 A1 | 6/2008 | Williams |
| 2008/0141809 A1 | 6/2008 | Miller et al. |
| 2008/0149407 A1 | 6/2008 | Shibata et al. |
| 2008/0200300 A1 | 8/2008 | Smithson et al. |
| 2008/0228362 A1 | 9/2008 | Muller et al. |
| 2008/0284170 A1 | 11/2008 | Cory |
| 2008/0305920 A1 | 12/2008 | Nishii et al. |
| 2009/0023545 A1 | 1/2009 | Beaudoin |
| 2009/0082169 A1 | 3/2009 | Kolstrup |
| 2009/0107454 A1 | 4/2009 | Hiyoshi et al. |
| 2009/0251013 A1 | 10/2009 | Vollmer et al. |
| 2010/0056322 A1 | 3/2010 | Thomassy |
| 2010/0093479 A1 | 4/2010 | Carter et al. |
| 2011/0088503 A1 | 4/2011 | Armstrong et al. |
| 2011/0127096 A1 | 6/2011 | Schneidewind |
| 2011/0184614 A1 | 7/2011 | Keilers et al. |

(56) References Cited

U.S. PATENT DOCUMENTS

| | | |
|---|---|---|
| 2011/0218072 A1 | 9/2011 | Lohr et al. |
| 2011/0230297 A1 | 9/2011 | Shiina et al. |
| 2011/0291507 A1 | 12/2011 | Post |
| 2011/0319222 A1 | 12/2011 | Ogawa et al. |
| 2012/0035015 A1 | 2/2012 | Ogawa et al. |
| 2012/0258839 A1 | 10/2012 | Smithson et al. |
| 2013/0035200 A1 | 2/2013 | Noji et al. |
| 2013/0053211 A1 | 2/2013 | Fukuda et al. |
| 2013/0072340 A1 | 3/2013 | Bazyn et al. |
| 2013/0079191 A1 | 3/2013 | Lohr |
| 2013/0080006 A1 | 3/2013 | Vasiliotis et al. |
| 2013/0095977 A1 | 4/2013 | Smithson et al. |
| 2013/0102434 A1 | 4/2013 | Nichols et al. |
| 2013/0106258 A1 | 5/2013 | Miller |
| 2013/0146406 A1 | 6/2013 | Nichols et al. |
| 2013/0152715 A1 | 6/2013 | Pohl et al. |
| 2013/0190123 A1 | 7/2013 | Pohl et al. |
| 2013/0288848 A1 | 10/2013 | Carter et al. |
| 2013/0310214 A1 | 11/2013 | Pohl et al. |
| 2013/0324344 A1 | 12/2013 | Pohl et al. |
| 2013/0331218 A1 | 12/2013 | Lohr et al. |
| 2013/0337971 A1 | 12/2013 | Kostrup |
| 2014/0011619 A1 | 1/2014 | Pohl et al. |
| 2014/0011628 A1 | 1/2014 | Lohr et al. |

FOREIGN PATENT DOCUMENTS

| | | |
|---|---|---|
| CN | 1157379 A | 8/1997 |
| CN | 1281540 A | 1/2001 |
| CN | 1283258 | 2/2001 |
| CN | 1940348 | 4/2007 |
| DE | 498 701 | 5/1930 |
| DE | 1165372 B | 3/1964 |
| DE | 1171692 | 6/1964 |
| DE | 2 310880 | 9/1974 |
| DE | 2 136 243 | 1/1975 |
| DE | 2436496 | 2/1975 |
| DE | 39 40 919 A1 | 6/1991 |
| DE | 19851738 A | 5/2000 |
| DE | 10155372 A1 | 5/2003 |
| EP | 0432742 | 12/1990 |
| EP | 0 528 381 | 2/1993 |
| EP | 0528382 | 2/1993 |
| EP | 635639 A1 | 1/1995 |
| EP | 0638741 | 2/1995 |
| EP | 0976956 | 2/2000 |
| EP | 1136724 | 9/2001 |
| EP | 1366978 | 3/2003 |
| EP | 1 433 641 | 6/2004 |
| EP | 1 624 230 | 2/2006 |
| EP | 1 811 202 | 7/2007 |
| FR | 620375 | 4/1927 |
| FR | 2460427 | 1/1981 |
| FR | 2590638 | 5/1987 |
| FR | 2909938 | 6/2008 |
| GB | 391448 | 4/1933 |
| GB | 592320 | 9/1947 |
| GB | 906 002 A | 9/1962 |
| GB | 919430 A | 2/1963 |
| GB | 1132473 | 11/1968 |
| GB | 1165545 | 10/1969 |
| GB | 1 376 057 | 12/1974 |
| GB | 2031822 | 4/1980 |
| GB | 2 035 482 | 6/1980 |
| GB | 2 080 452 | 8/1982 |
| JP | 44-1098 | 1/1944 |
| JP | 42-2843 | 2/1967 |
| JP | 42-2844 | 2/1967 |
| JP | 47-000448 | 7/1972 |
| JP | 47-29762 | 11/1972 |
| JP | 48-54371 | 7/1973 |
| JP | 49-12742 | 3/1974 |
| JP | 50-114581 | 9/1975 |
| JP | 51-25903 | 8/1976 |
| JP | 51-150380 | 12/1976 |
| JP | 47-20535 | 8/1977 |
| JP | 53-048166 | 1/1978 |
| JP | 55-135259 | 4/1979 |
| JP | 56-047231 | 4/1981 |
| JP | A-S56-127852 | 10/1981 |
| JP | 58-065361 | 4/1983 |
| JP | 59069565 | 4/1984 |
| JP | 59-144826 | 8/1984 |
| JP | 60-247011 | 12/1985 |
| JP | 61-031754 | 2/1986 |
| JP | 61-144466 | 7/1986 |
| JP | 61-173722 | 10/1986 |
| JP | 61-270552 | 11/1986 |
| JP | 62-075170 | 4/1987 |
| JP | 63-219953 | 9/1988 |
| JP | 63219953 | 9/1988 |
| JP | 63-160465 | 10/1988 |
| JP | 01-308142 | 12/1989 |
| JP | 02-157483 | 6/1990 |
| JP | 02-271142 | 6/1990 |
| JP | 04-166619 | 6/1992 |
| JP | 04-272553 | 9/1992 |
| JP | 4-351361 | 12/1992 |
| JP | 5-87154 | 4/1993 |
| JP | 52-35481 | 9/1993 |
| JP | 6-50358 | 2/1994 |
| JP | 7-42799 | 2/1995 |
| JP | 7-139600 | 5/1995 |
| JP | 08-170706 A | 7/1996 |
| JP | 09-024743 A | 1/1997 |
| JP | 09-089064 | 3/1997 |
| JP | 10-115356 | 5/1998 |
| JP | 10-194186 | 7/1998 |
| JP | 411063130 | 3/1999 |
| JP | 11-257479 | 9/1999 |
| JP | 2000-46135 | 2/2000 |
| JP | 2001-27298 | 1/2001 |
| JP | 2001-107827 | 4/2001 |
| JP | 2001-165296 | 6/2001 |
| JP | 2001-521109 A | 11/2001 |
| JP | 2002-147558 | 5/2002 |
| JP | 2002-250421 | 6/2002 |
| JP | 2003-028257 | 1/2003 |
| JP | 2003-56662 | 2/2003 |
| JP | 2003-161357 | 6/2003 |
| JP | 2003-524119 | 8/2003 |
| JP | 2003-336732 | 11/2003 |
| JP | 2004-162652 A | 6/2004 |
| JP | 8-247245 | 9/2004 |
| JP | 2004-526917 | 9/2004 |
| JP | 2005-240928 A | 9/2005 |
| JP | 2006015025 | 1/2006 |
| JP | 2006-300241 | 11/2006 |
| JP | 2008-002687 | 1/2008 |
| JP | 03-149442 | 1/2009 |
| JP | 2010-069005 | 4/2010 |
| JP | 2007-535715 | 7/2012 |
| NE | 98467 | 7/1961 |
| TW | 74007 | 1/1984 |
| TW | 175100 | 12/1991 |
| TW | 218909 | 1/1994 |
| TW | 227206 | 7/1994 |
| TW | 360184 | 6/1999 |
| TW | 512211 | 12/2002 |
| TW | 582363 | 4/2004 |
| TW | 590955 | 6/2004 |
| TW | I225129 | 12/2004 |
| TW | I225912 | 1/2005 |
| TW | I235214 | 1/2005 |
| TW | M294598 | 7/2006 |
| TW | 200637745 A | 11/2006 |
| WO | WO 99/20918 | 4/1999 |
| WO | WO 01/73319 | 10/2001 |
| WO | WO 03/100294 | 12/2003 |
| WO | WO 2005/083305 | 9/2005 |
| WO | WO 2006/091503 | 8/2006 |
| WO | WO 2008/002457 | 1/2008 |
| WO | WO 2008/057507 | 5/2008 |

(56) References Cited

FOREIGN PATENT DOCUMENTS

| WO | WO 2008/078047 | 7/2008 |
|---|---|---|
| WO | WO 2008/095116 | 8/2008 |
| WO | WO 2008/100792 | 8/2008 |
| WO | WO 2008/131353 | 10/2008 |
| WO | WO 2008/154437 | 12/2008 |
| WO | WO 2009/006481 | 1/2009 |
| WO | WO 2009/148461 | 12/2009 |
| WO | WO 2009/157920 | 12/2009 |
| WO | WO 2010/017242 | 2/2010 |
| WO | WO 2010/135407 | 11/2010 |
| WO | WO 2011/101991 | 8/2011 |
| WO | WO 2013/112408 | 8/2013 |

OTHER PUBLICATIONS

Office Action dated Feb. 12, 2010 from Japanese Patent Application No. 2009-294086.
Office Action dated Feb. 17, 2010 from Japanese Patent Application No. 2006-508892.
International Preliminary Report on Patentability dated Mar. 1, 2011 for PCT Application No. PCT/US2008/074496.
International Search Report and Written Opinion dated May 8, 2009 for PCT Application No. PCT/US2008/074496.
Chinese Office Action dated Mar. 25, 2013 for Chinese Patent Application No. 200880131268.1.
European Search Report dated Sep. 7, 2012 for European Patent Application No. 12176385.8.
Japanese Office Action dated Feb. 12, 2013 for Japanese Patent Application No. 2011-524950.
Office Action dated Feb. 6, 2012 for U.S. Appl. No. 12/198,402.
Office Action dated Jul. 27, 2012 for U.S. Appl. No. 12/198,402.
Office Action dated Nov. 16, 2012 for U.S. Appl. No. 12/198,402.
Office Action dated Oct. 12, 2012 for U.S. Appl. No. 12/198,402.
Office Action dated Oct. 17, 2012 for Russian Patent Application No. 2011106348.
Thomassy: An Engineering Approach to Simulating Traction EHL. CVT-Hybrid International Conference Mecc/Maastricht/The Netherlands, Nov. 17-19, 2010, p. 97.
Office Action dated Jan. 17, 2013 in U.S. Appl. No. 13/924,304.
Chinese Office Action dated Nov. 18, 2013 for Chinese Patent Application No. 200880131268.1.
Japanese Office Action dated Aug. 6, 2013 for Japanese Patent Application No. 2011-524950.

* cited by examiner

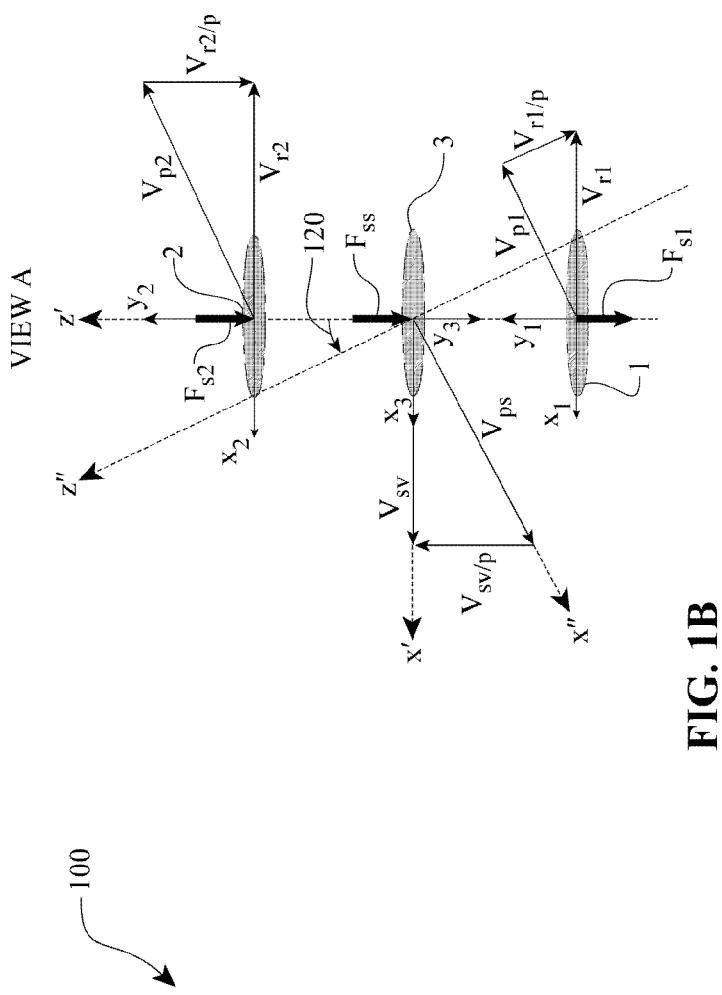
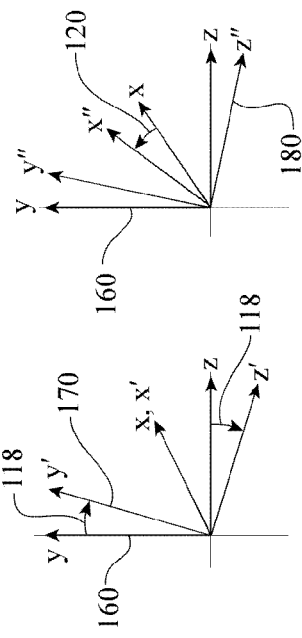
FIG. 1B
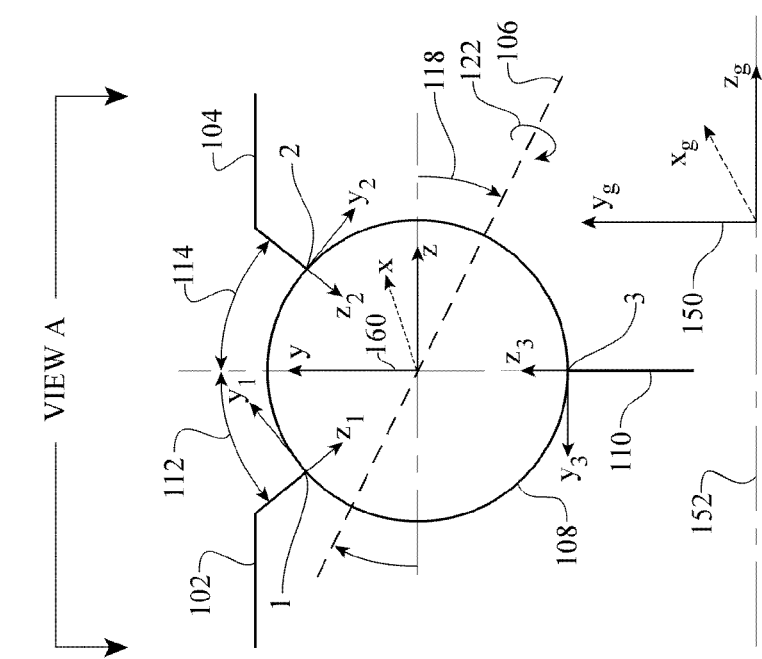
FIG. 1A

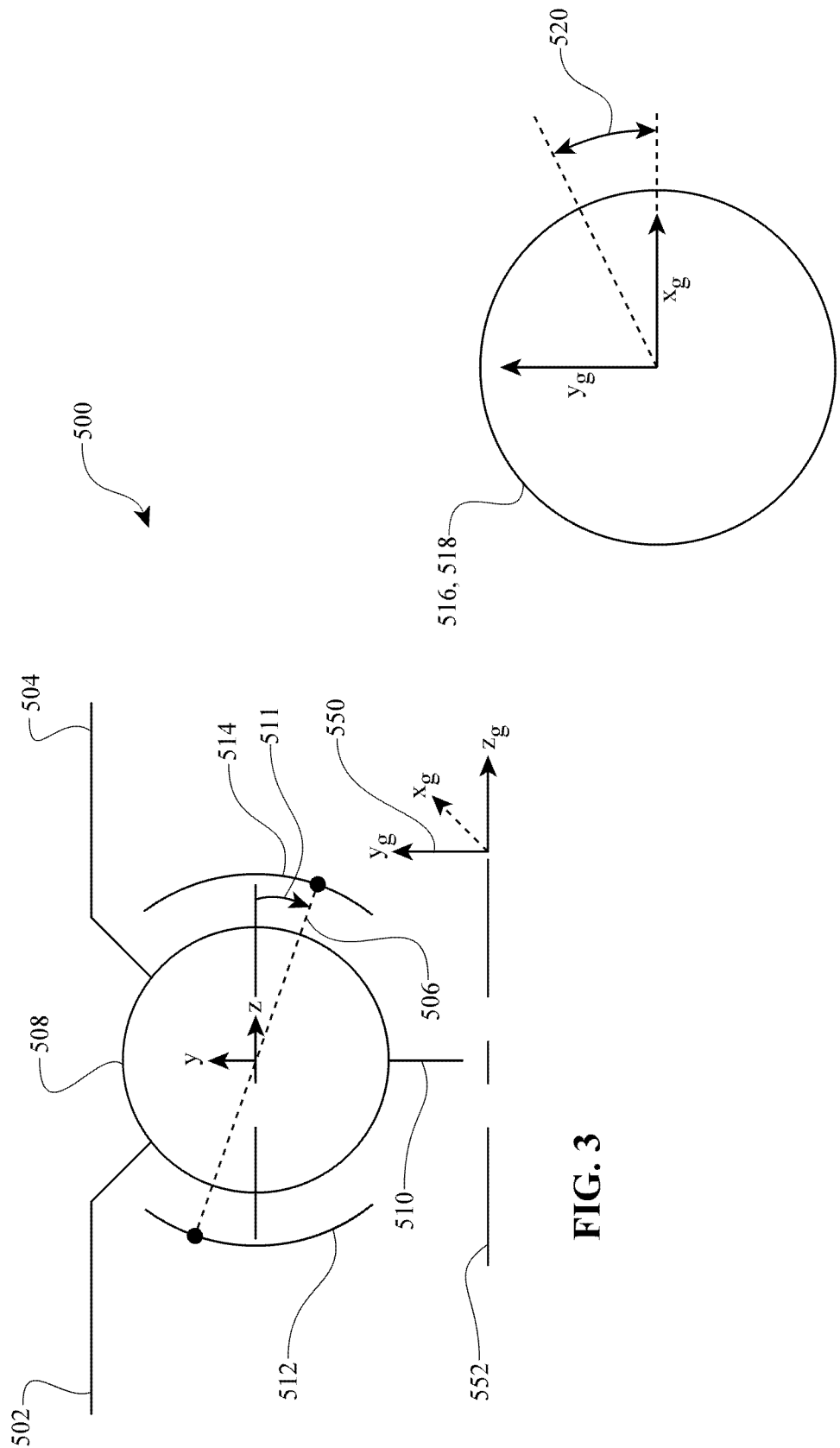

β ≠ 0

β = 0

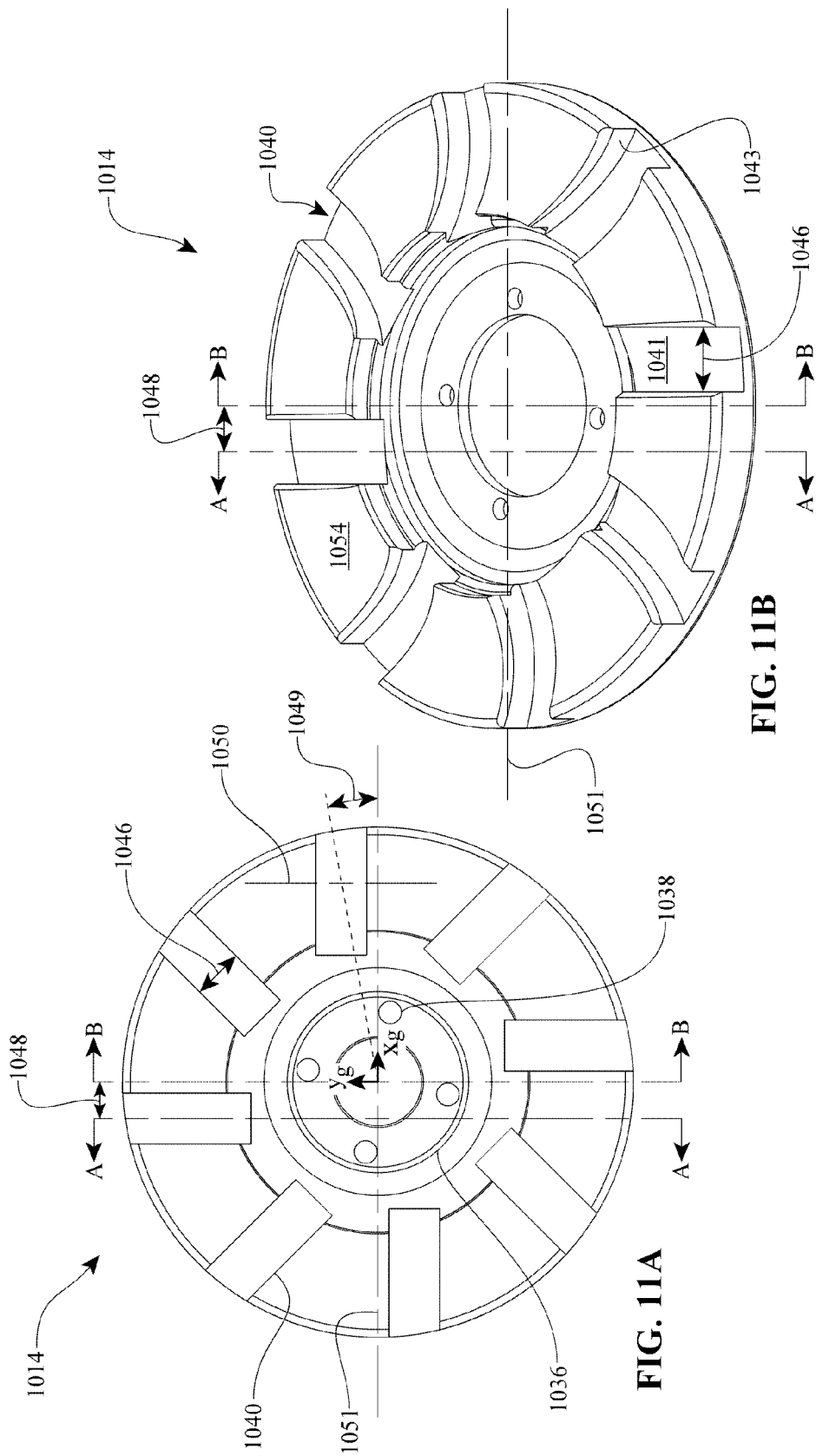

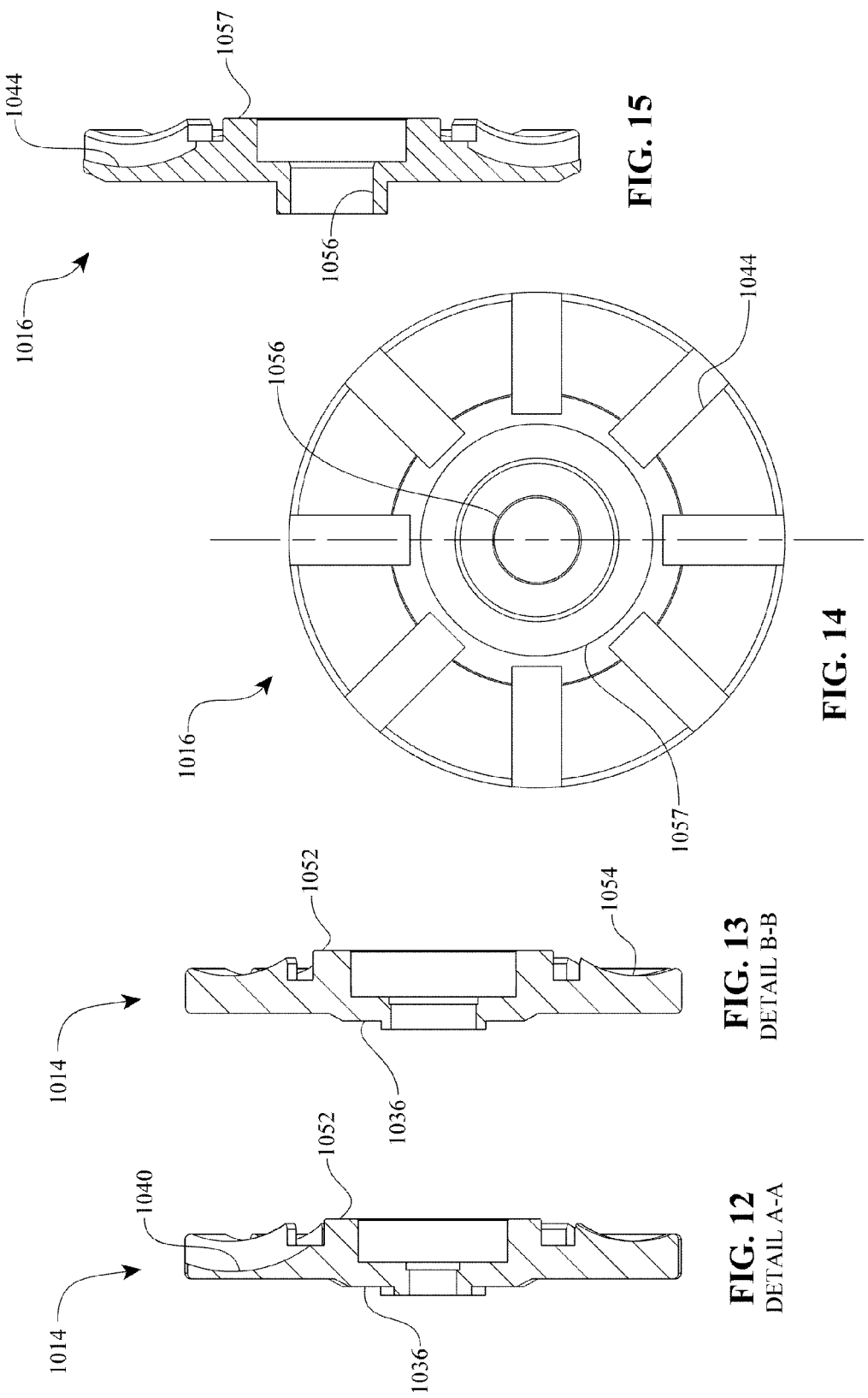

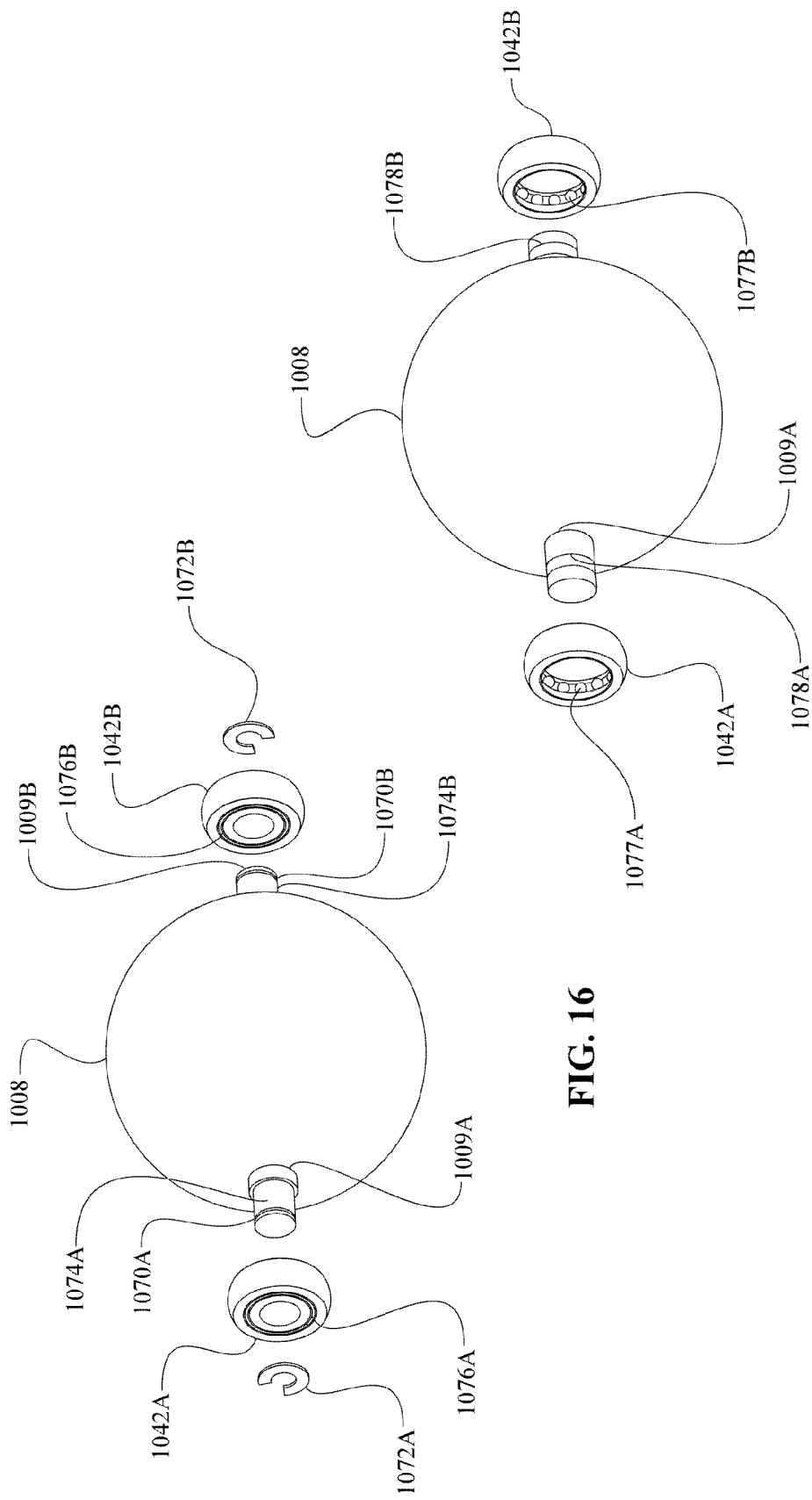

CONTINUOUSLY VARIABLE TRANSMISSION

CROSS REFERENCE TO RELATED APPLICATIONS

This application is a continuation of U.S. patent application Ser. No. 12/198,402, filed Aug. 26, 2008 and issued as U.S. Pat. No. 8,469,856 on Jun. 25, 2013. The disclosures of all of the above-referenced prior applications, publication, and patents are considered part of the disclosure of this application, and are incorporated by reference herein in their entirety.

BACKGROUND OF THE INVENTION

1. Field of the Invention

The field of the invention relates generally to transmissions, and more particularly to methods, assemblies, and components for continuously variable transmissions (CVTs).

2. Description of the Related Art

There are well-known ways to achieve continuously variable ratios of input speed to output speed. Typically, a mechanism for adjusting the speed ratio of an output speed to an input speed in a CVT is known as a variator. In a belt-type CVT, the variator consists of two adjustable pulleys coupled by a belt. The variator in a single cavity toroidal-type CVT usually has two partially toroidal transmission discs rotating about a shaft and two or more disc-shaped power rollers rotating on respective axes that are perpendicular to the shaft and clamped between the input and output transmission discs. Usually, a control system is used for the variator so that the desired speed ratio can be achieved in operation.

Embodiments of the variator disclosed here are of the spherical-type variator utilizing spherical speed adjusters (also known as power adjusters, balls, planets, sphere gears, or rollers) that each has a tiltable axis of rotation adapted to be adjusted to achieve a desired ratio of output speed to input speed during operation. The speed adjusters are angularly distributed in a plane perpendicular to a longitudinal axis of a CVT. The speed adjusters are contacted on one side by an input disc and on the other side by an output disc, one or both of which apply a clamping contact force to the rollers for transmission of torque. The input disc applies input torque at an input rotational speed to the speed adjusters. As the speed adjusters rotate about their own axes, the speed adjusters transmit the torque to the output disc. The output speed to input speed ratio is a function of the radii of the contact points of the input and output discs to the axes of the speed adjusters. Tilting the axes of the speed adjusters with respect to the axis of the variator adjusts the speed ratio.

There is a continuing need in the industry for variators and control systems therefor that provide improved performance and operational control. Embodiments of the systems and methods disclosed here address said need.

SUMMARY OF THE INVENTION

The systems and methods herein described have several features, no single one of which is solely responsible for its desirable attributes. Without limiting the scope as expressed by the claims that follow, its more prominent features will now be discussed briefly. After considering this discussion, and particularly after reading the section entitled "Detailed Description of Certain Inventive Embodiments" one will understand how the features of the system and methods provide several advantages over traditional systems and methods.

One aspect of the invention relates to a method of adjusting a speed ratio of a continuously variable transmission (CVT) having a group of traction planets. Each traction planet has a tiltable axis of rotation. The method includes the step of configuring a stator of the CVT to apply a skew condition to each tiltable axis of rotation independently. In one embodiment, the skew condition is based at least in part on an angular displacement of the stator plate. In another embodiment, the skew condition is based at least in part on a tilt angle of the tiltable axis of rotation.

Another aspect of the invention concerns a method of adjusting a speed ratio of a continuously variable transmission (CVT) that has a group of traction planets. Each traction planet has a tiltable axis of rotation. In one embodiment, the method includes the step of rotating a stator to which each traction planet is operably coupled. The stator can be configured to independently apply a skew condition to each tiltable axis of rotation. The method can also include the step of guiding each tiltable axis of rotation to an equilibrium condition. The equilibrium condition can be based at least in part on the rotation of the stator plate. In some embodiments, the equilibrium condition substantially has a zero-skew angle condition.

Yet another aspect of the invention concerns a method of supporting a group of traction planets of a continuously variable transmission (CVT). Each traction planet has a tiltable axis of rotation. In one embodiment, the method includes the step of providing a first stator plate having a number of radially offset slots. The radially offset slots are arranged angularly about a center of the first stator plate. The method can include the step of operably coupling each of the traction planets to the first stator plate. In one embodiment, the method includes the step of providing a second stator plate having a number of radial slots. The radial slots can be arranged angularly about the center of the second stator plate. The method can also include the step of operably coupling the traction planets to the second stator plate.

One aspect of the invention concerns a method of adjusting a speed ratio of a continuously variable transmission (CVT) that has a group of traction planets. Each traction planet has a tiltable axis of rotation. The method includes the step of providing a stator plate operably coupled to each of the traction planets. In one embodiment, the method includes the step of receiving a set point for a speed ratio of the CVT. The method can include the step of determining a set point for an angular displacement of the stator plate. The set point can be based at least in part on the set point for the speed ratio. The method can also include the step of rotating the stator plate to the set point for the angular displacement of the stator plate. Rotating the stator plate can induce a skew condition on each tiltable axis of rotation. The stator plate can be configured to adjust the skew condition as each tiltable axis of rotation tilts.

Another aspect of the invention concerns a method of adjusting a speed ratio of a continuously variable transmission (CVT) that has a group of traction planets. Each traction planet can be configured to have a tiltable axis of rotation. The method can include the step of determining a set point for a speed ratio of the CVT. In one embodiment, the method can include the step of measuring an actual speed ratio of the CVT. The method includes the step of comparing the actual speed ratio to the set point for the speed ratio to thereby generate a comparison value. The method also includes the step of rotating a stator plate to an angular displacement based at least in part on the comparison value. Rotating the stator plate applies a skew condition to each of the traction planets. The skew condition changes as each tiltable axis of rotation tilts and the angular displacement remains constant.

Yet one more aspect of the invention addresses a continuously variable transmission (CVT) that has a group of traction planets arranged angularly about a main drive axis. Each traction planet has a tiltable axis of rotation. The CVT has a first stator plate that is coaxial with the main drive axis. The first stator plate can have a number of radially offset slots. The radially offset slots can be configured such that each tiltable axis is guided independently from the others. The CVT can have a second stator plate coaxial with the main drive axis. The second stator plate can have a number of radial slots. The radial slots can be configured to independently guide the tiltable axes of rotation. The first stator plate is configured to rotate relative to the second stator plate.

In another aspect, the invention concerns a stator plate for a continuously variable transmission (CVT) that has a number of traction planets. The stator plate can have a substantially disc shaped body having a center. In one embodiment, the stator plate can have a number of radially offset guides arranged angularly about the center. Each of the radially offset guides can have a linear offset from a centerline of the disc shaped body.

Another aspect of the invention relates to a continuously variable transmission (CVT) that has a group of traction planets. Each traction planet has a tiltable axis of rotation. In one embodiment, the CVT has a first stator plate arranged coaxial about a main drive axis of the CVT. The first stator plate can be operably coupled to each traction planet. The first stator plate can have a number of radially offset slots arranged angularly about a center of the first stator plate. Each of the radially offset slots can have a linear offset from a centerline of the first stator plate. The CVT can also have a second stator plate arranged coaxial about a main drive axis of the CVT. The second stator plate has a number of radial slots. The radial slots can be arranged angularly about a center of the second stator plate. Each of the radial slots is substantially radially aligned with the center of the second stator plate. The CVT can have an actuator operably coupled to at least one of the first and second stator plates. The actuator can be configured to impart a relative rotation between the first and second stator plates.

One aspect of the invention relates to a ball planetary continuously variable transmission (CVT) that includes a group of traction planets. Each traction planet has a tiltable axis of rotation. The CVT can also include a first guide aligned with a line perpendicular to a main drive axis of the CVT. The first guide can be configured to act upon the tiltable axis of rotation. The CVT can also include a second guide aligned with a line that is parallel to the line perpendicular to the main drive axis of the CVT. The second guide can be configured to act upon the tiltable axis of rotation.

Another aspect of the invention concerns a method of manufacturing a continuously variable transmission (CVT). In one embodiment, the method includes the step of providing a first guide radially aligned with a line perpendicular to a main drive axis of the CVT. The method includes the step of providing a second guide offset. On a projection plane, respective projection lines of the first and second guides intersect thereby forming an intersection location. The method can include the step of operably coupling a group of traction planets to the first and second guides. The method can also include the step of configuring the first and second guides such that they are capable of rotation relative to one another about the main drive axis.

BRIEF DESCRIPTION OF THE FIGURES

FIG. 1A is a schematic diagram of certain components of a ball planetary continuously variable transmission (CVT) and certain relevant coordinate systems.

FIG. 1B is a diagram of certain relative-coordinate systems related to a coordinate system shown in FIG. 1A.

FIG. 1C is a schematic diagram of certain kinematic relationships between certain contacting components of the CVT of FIG. 1A.

FIG. 3 is a schematic diagram of certain components of a ball planetary CVT and certain relevant coordinate systems.

FIG. 4 is a schematic diagram of certain components of the CVT of FIG. 3 and certain relevant coordinate systems.

FIG. 11A is a plan view of an inventive embodiment of a stator plate that can be used with the CVT of FIG. 7.

FIG. 11B is a perspective view of the stator plate of FIG. 11A.

FIG. 12 is a cross-section view A-A of the stator plate of FIG. 11A.

FIG. 13 is a cross-section view B-B of the stator plate of FIG. 11A.

FIG. 14 is a plan view of another embodiment of a stator plate that can be used with the CVT of FIG. 3.

FIG. 15 is a cross-sectional view of the stator plate of FIG. 14.

FIG. 16 is an exploded, perspective view of a traction planet subassembly that can be used with the CVT of FIG. 6.

FIG. 17 is an exploded, perspective view of another embodiment of a traction planet subassembly that can be used with the CVT of FIG. 6.

DETAILED DESCRIPTION OF CERTAIN INVENTIVE EMBODIMENTS

Figure 1F:
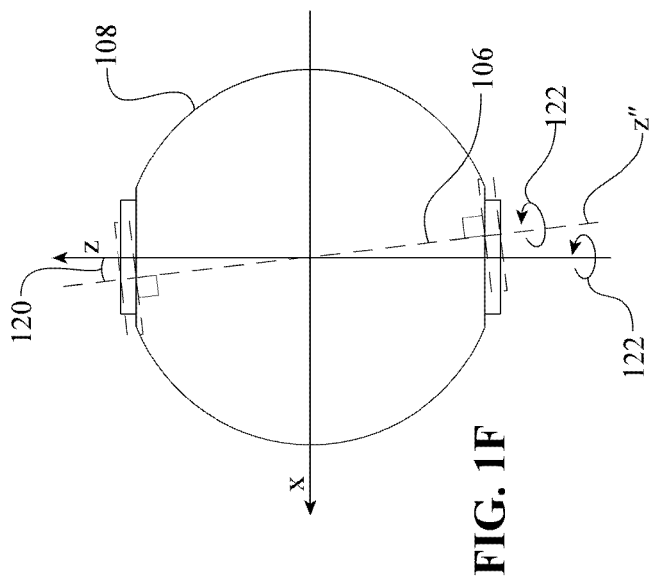
FIG. 1F is a schematic diagram of a traction planet of the CVT of FIG. 1A showing a skew angle.

The preferred embodiments will be described now with reference to the accompanying figures, wherein like numerals refer to like elements throughout. The terminology used in the descriptions below is not to be interpreted in any limited or restrictive manner simply because it is used in conjunction with detailed descriptions of certain specific embodiments of the invention. Furthermore, embodiments of the invention can include several inventive features, no single one of which is solely responsible for its desirable attributes or which is essential to practicing the inventions described. Certain CVT embodiments described here are generally related to the type disclosed in U.S. Pat. Nos. 6,241,636; 6,419,608; 6,689,012; 7,011,600; 7,166,052; U.S. patent application Ser. No. 11/243,484 and Ser. No. 11/543,311; and Patent Cooperation Treaty patent applications PCT/IB2006/054911 and PCT/US2007/023315. The entire disclosure of each of these patents and patent applications is hereby incorporated herein by reference.

As used here, the terms "operationally connected," "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe inventive embodiments, specific structures or mechanisms that link or couple the elements are typically described. However, unless otherwise specifically stated, when one of said terms is used, the term indicates that the actual linkage or coupling may take a variety of forms, which in certain instances will be readily apparent to a person of ordinary skill in the relevant technology.

For description purposes, the term "radial" is used here to indicate a direction or position that is perpendicular relative to a longitudinal axis of a transmission or variator. The term "axial" as used here refers to a direction or position along an axis that is parallel to a main or longitudinal axis of a transmission or variator. For clarity and conciseness, at times similar components labeled similarly (for example, bearing 1011A and bearing 1011B) will be referred to collectively by a single label (for example, bearing 1011).

It should be noted that reference herein to "traction" does not exclude applications where the dominant or exclusive mode of power transfer is through "friction." Without attempting to establish a categorical difference between traction and friction drives here, generally these may be understood as different regimes of power transfer. Traction drives usually involve the transfer of power between two elements by shear forces in a thin fluid layer trapped between the elements. The fluids used in these applications usually exhibit traction coefficients greater than conventional mineral oils. The traction coefficient ($\mu$) represents the maximum available traction forces which would be available at the interfaces of the contacting components and is a measure of the maximum available drive torque. Typically, friction drives generally relate to transferring power between two elements by frictional forces between the elements. For the purposes of this disclosure, it should be understood that the CVTs described here may operate in both tractive and frictional applications. For example, in the embodiment where a CVT is used for a bicycle application, the CVT can operate at times as a friction drive and at other times as a traction drive, depending on the torque and speed conditions present during operation.

Embodiments of the invention disclosed here are related to the control of a variator and/or a CVT using generally spherical planets each having a tiltable axis of rotation (hereinafter "planet axis of rotation") that can be adjusted to achieve a desired ratio of input speed to output speed during operation. In some embodiments, adjustment of said axis of rotation involves angular misalignment of the planet axis in one plane in order to achieve an angular adjustment of the planet axis of rotation in a second plane, thereby adjusting the speed ratio of the variator. The angular misalignment in the first plane is referred to here as "skew" or "skew angle". In one embodiment, a control system coordinates the use of a skew angle to generate forces between certain contacting components in the variator that will tilt the planet axis of rotation. The tilting of the planet axis of rotation adjusts the speed ratio of the variator. In the description that follows, a coordinate system is established with respect to a spherical traction planet, followed by a discussion of certain kinematic relationships between contacting components that generate forces which tend to cause the planet axis of rotation to tilt in the presence of a skew angle. Embodiments of skew control systems for attaining a desired speed ratio of a variator will be discussed.

Turning now to FIGS. 1A and 1B, coordinate systems will be defined in reference to embodiments of certain components of a continuously variable transmission (CVT). The coordinate systems are shown here for illustrative purposes and should not be construed as the only frame of reference applicable to the embodiments discussed here. An embodiment of a CVT 100 includes generally spherical traction planets 108 in contact with a traction sun 110 (which is schematically shown as a line). The traction planets 108 are also in contact with a first traction ring 102 and a second traction ring 104 at, respectively, a first angular position 112 and a second angular position 114. A global coordinate system 150 (that is, $x_g$, $y_g$, $z_g$) and a planet-centered coordinate system 160 (that is, x, y, z) are defined in FIG. 1A. The global coordinate system 150 is generally oriented with respect to a longitudinal axis or main drive axis 152 of the CVT 100, for example with the $z_g$-axis coinciding with a main drive axis 152 about which the traction planets 108 are arranged. The planet-centered coordinate system 160 has its origin at the geometric center of the traction planet 108, with the y-axis generally perpendicular to the main drive axis 152, and the z-axis generally parallel to the main drive axis 152. Each of the traction planets 108 has a planet axis of rotation, that is, a planet axis 106, which can be configured to rotate about the x-axis to thereby form a tilt angle 118 projected onto the y-z plane (sometimes referred to here as $\gamma$). The tilt angle 118 determines the kinematic speed ratio between the traction rings 102, 104. Each of the planets 108 has a rotational velocity about the planet axis 106 and is shown in FIG. 1A as planet velocity 122, sometimes referred to here as co. Typically the planet axis 106 corresponds structurally to a planet axle, which can be operationally coupled to a carrier or a cage (not shown) that can be stationary, while in other embodiments the planet axle is coupled to a carrier (not shown) that is rotatable about main drive axis 152. In the planet-centered coordinate system 160, the x-axis is directed into the plane of the page (though not shown precisely as such in FIG. 1A), and the z-axis is generally parallel to the main drive axis 152. For purposes of illustration, the tilt angle 118 is generally defined in the $y_g$-$z_g$ plane.

Turning now to FIG. 1B, the planet-centered coordinate system 160 is resolved further to illustrate the angular adjustments of the planet axis 106 that are used in the embodiments of skew control systems described here. As shown in FIG. 1B, a tilt angle 118 can be derived by rotating the coordinate system 160 with the planet axis 106 in the y-z plane about the x-axis to achieve a first relative coordinate system 170 (x', y', z'). In the relative coordinate system 170, the planet axis 106 coincides with the z'-axis. By rotating the coordinate system 170 with the planet axis 106 about the y-axis, a skew angle 120 (sometimes referred to here as ς) can be obtained in a x-z plane, which is illustrated by a second relative coordinate system 180 (x", y", z"). The skew angle 120 can be considered, approximately, the projection in the x-z plane of the angular alignment of the planet axis 106. More specifically, however, the skew angle 120 is the angular position of the planet axis 106 in the x'-z' plane as defined by the relative coordinate systems 170 and 180. In one embodiment of the CVT 100, the tilt angle 118 is controlled, at least in part, through an adjustment of the skew angle 120.

Referring now to FIG. 1C, certain kinematic relationships between contacting components of the CVT 100 will be described to explain how the inducement of a skew condition generates forces that tend to adjust the tilt angle 118. As used here, the phrase "skew condition" refers to an arrangement of the planet axis 106 relative to the main drive axis 152 such that a non-zero skew angle 120 exists. Hence, reference to "inducement of a skew condition" implies an inducement of the planet axis 106 to align at a non-zero skew angle 120. It should be noted that in certain embodiments of the CVT 100 certain spin-induced forces also act on the traction planet 108. Spin is a phenomenon of traction contacts well known to those of ordinary skill in the relevant technology. For our immediate discussion, the effects of the spin-induced forces will be ignored. In the CVT 100, components contact the traction planet 108 at three locations to form traction or friction contact areas. With reference to FIG. 1, the first ring 102 drives the planet 108 at a contact 1, and the planet 108 transmits power to the second ring 104 at a contact 2. The traction sun 110 supports the traction planet 108 at a contact 3. For discussion purposes, the three contacts 1, 2, 3 are arranged in FIG. 1C to reflect a view of the x"-z" plane as seen from a reference above the CVT 100, or View A in FIG. 1A. Since the contact areas 1, 2, 3 are not coplanar, contact-centered coordinate systems are used in FIG. 1C so that the contact areas 1, 2, 3 can be illustrated with the x"-z" plane. Subscripts 1, 2, and 3 are used to denote the specific contact area for contact-centered coordinate systems. The $z_{1,2,3}$-axis are directed at the center of the traction planet 108.

Referring now to contact area 1 in FIG. 1C, the surface velocity of the first traction ring 102 is denoted in the negative $x_1$ direction by a vector $V_{r1}$ and the surface velocity of the planet 108 is represented by a vector $V_{p1}$; the angle formed between the vectors $V_{r1}$ and $V_{p1}$ is approximately the skew angle 120. The resulting relative surface velocity between the traction ring 102 and the traction planet 108 is represented by a vector $V_{r1/p}$. At the contact area 3 between the traction planet 108 and the traction sun 110, the surface velocity of the traction sun 110 is represented by a vector $V_{sv}$ and the surface velocity of the traction planet 108 is represented by a vector $V_{ps}$; the angle formed between $V_{sv}$ and $V_{ps}$ is the skew angle 120. The relative surface velocity between the traction planet 108 and the traction sun 110 is represented by a vector $V_{sv/p}$. Similarly, for contact 2, the surface velocity of the traction planet 108 at the contact area 2 is shown as a vector $V_{p2}$ and the surface velocity of the second traction ring 104 is represented by a vector $V_{r2}$; the angle formed between $V_{p2}$ and $V_{r2}$ is approximately the skew angle 120; the relative surface velocity between the traction planet 108 and the second traction ring 104 is the resultant vector $V_{r2/p}$.

The kinematic relationships discussed above tend to generate forces at the contacting components. FIG. 1D shows a generalized, representative traction curve that can be applied at each of contact areas 1, 2, 3. The graph illustrates the relationship between the traction coefficient μ and the relative velocity between contacting components. The traction coefficient μ is indicative of the capacity of the fluid to transmit a force. The relative velocity, such as $V_{r1/p}$, can be a function of the skew angle 120. The traction coefficient μ is the vector sum of the traction coefficient in the x-direction $μ_x$ and the traction coefficient in the y-direction $μ_y$ at a contact area 1, 2, or 3. As a general matter, the traction coefficient μ is a function of the traction fluid properties, the normal force at the contact area, and the velocity of the traction fluid in the contact area, among other things. For a given traction fluid, the traction coefficient μ increases with increasing relative velocities of components, until the traction coefficient μ reaches a maximum capacity after which the traction coefficient μ decays. Consequently, in the presence of a skew angle 120 (that is, under a skew condition), forces are generated at the contact areas 1, 2, 3 around the traction planet 108 due to the kinematic conditions. Referring to FIGS. 1C and 1E, $V_{r1/p}$ generates a traction force parallel to the $V_{r1/p}$ with a component side force $F_{s1}$. Increasing the skew angle 120 increases the $V_{r1/p}$ and, thereby, increases the force $F_{s1}$ according to the general relationship shown in FIG. 1D. The $V_{sv/p}$ generates a force $F_{ss}$, and similarly, the $V_{r2/p}$ generates a force $F_{s2}$. The forces $F_{s1}$, $F_{ss}$, and $F_{s2}$ combine to create a net moment about the traction planet 108 in the y-z plane. More specifically, the summation of moments about the traction roller 108 is $\Sigma M = R^*(F_{s1} + F_{s2} + F_{ss})$, where R is the radius of the traction roller 108, and the forces $F_{s1}$, $F_{s2}$, and $F_{ss}$ are the resultant components of the contact forces in the y-z plane. The contact forces, some times referred to here as skew-induced forces, in the above equation are as follows: $F_{s1} = μ_{y1} N_1$, $F_{s2} = μ_{y2} N_2$, $F_{ss} = μ_{ys} N_3$, where $N_{1,2,3}$ is the normal force at the respective contact area 1, 2, 3. Since the traction coefficient μ is a function of relative velocity between contacting components, the traction coefficients $μ_{y1}$, $μ_{y2}$, and $μ_{ys}$ are consequently a function of the skew angle 120 as related by the kinematic relationship. By definition, a moment is the acceleration of inertia; hence, in the embodiment illustrated here, the moment will generate a tilt angle acceleration $\ddot{γ}$. Therefore, the rate of change of the tilt angle $\dot{γ}$ is a function of the skew angle 120.

Figure 1E:
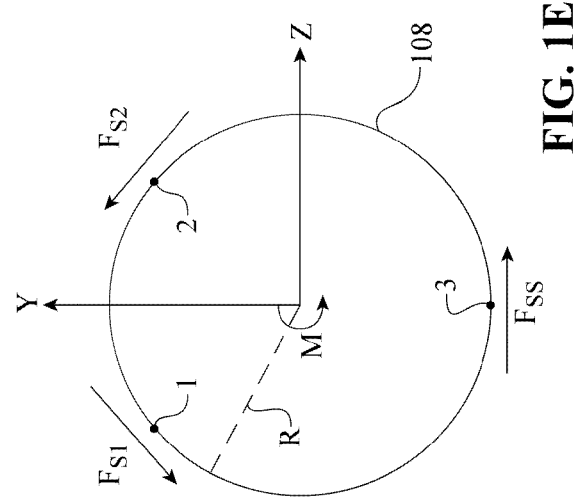
FIG. 1E is a free body diagram of a traction planet of the CVT of FIG. 1A.
Figure 1D:
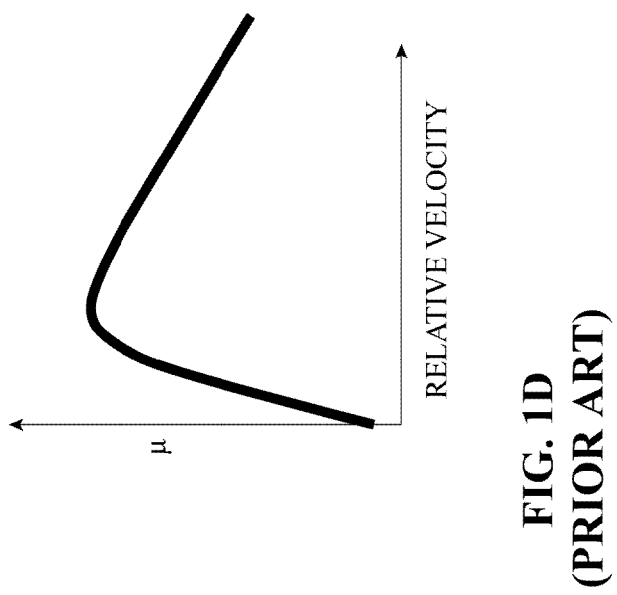
FIG. 1D is a representative chart of traction coefficient versus relative velocity for a typical traction fluid and rolling contact between CVT traction components.

Turning now to FIG. 1F, a traction planet 108 is illustrated having a tilt angle 118 equal to zero, which results in the planet axis of rotation 106 being generally parallel (in the yg-zg plane) to the main drive axis 152 of the CVT 100 and the rotational velocity 122 of the traction planet 108 is coaxial with the z-axis. A skew angle 120 can be formed in the x-z plane to generate forces for motivating a change in the tilt angle 118. In the presence of the skew angle 120, the traction planet 108 would have a rotational velocity 122 about an axis z", and the tilt angle 118 would be formed in the y-z' plane.

Figure 2:
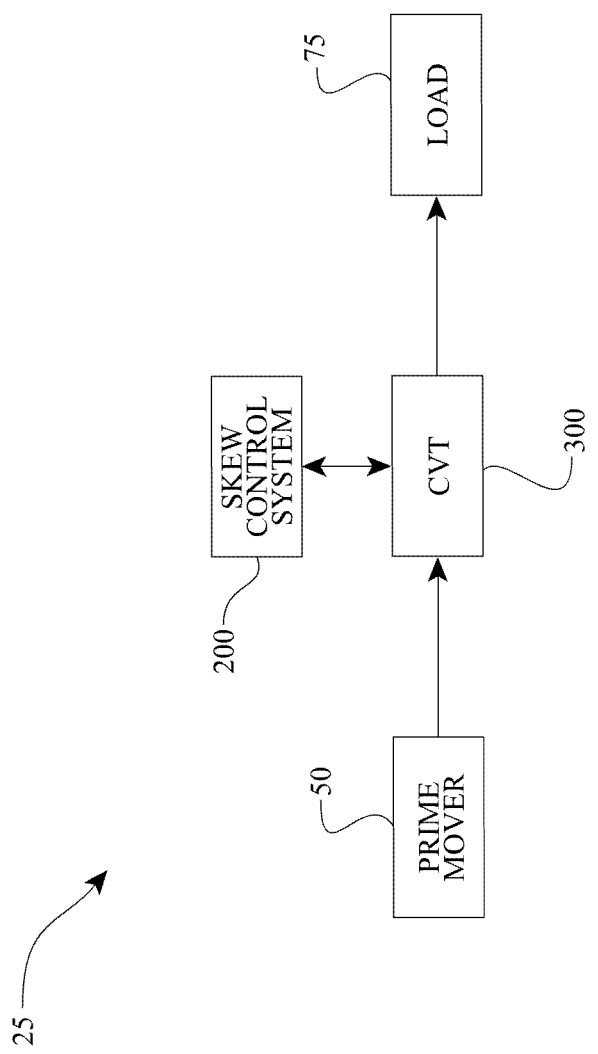
FIG. 2 is a block diagram of an embodiment of a drive apparatus configured to use certain inventive embodiments of CVTs and skew control systems and methods therefor disclosed here.

Passing now to FIGS. 2-17, embodiments of certain control systems for a CVT that rely on inducing a skew condition to motivate a change in the tilt angle 118 will be described now. FIG. 2 shows a drive 25 that includes a CVT 300 operationally coupled between a prime mover 50 and a load 75. The drive 25 can also include a skew-based control system 200. Typically, the prime mover 50 delivers power to the CVT 300, and the CVT 300 delivers power to a load 75. The prime mover 50 can be one or more of various power generating devices, and the load 75 can be one or more of various driven devices or components. Examples of the prime mover 50 include, but are not limited to, human power, internal combustion engines, electric motors and the like. Examples of loads include, but are not limited to, drivetrain differential assemblies, power take-off assemblies, generator assemblies, pump assemblies, and the like. In some embodiments, the skew control system 200 can coordinate the operation of the CVT 300 as well as the prime mover 50, or can coordinate the operation of the CVT 300 and the load 75, or can coordinate the operation of all elements in the drive 25. In the embodiment illustrated in FIG. 2, the skew control system 200 can be configured to use an adjustment of a skew angle 120 to control the operating condition of the CVT 300, and consequently, coordinate the control of the drive 25.

Referring now to FIGS. 3-5B, in one embodiment, a CVT 500 includes a number of substantially spherical traction planets 508 configured to contact a traction sun 510. The traction planets 508 can also contact a first traction ring 502 and a second traction ring 504. The traction rings 502, 504 can be arranged in a substantially similar manner as the first traction ring 102 and the second traction ring 104 depicted in FIG. 1A. The areas of contact between the traction planet 508, the first traction ring 502, the second traction ring 504, and the traction sun 510 are substantially similar to contacts 1, 2, and 3, respectively, depicted in FIGS. 1A-1F. Likewise, the contact-centered coordinate systems and the kinematic relationships discussed in reference to FIGS. 1A-1F can be applied to the CVT 500 for descriptive purposes.

In one embodiment, a global coordinate system 550 (that is, $x_g$, $y_g$, $z_g$) is defined with reference to FIG. 3. The global coordinate system 550 is substantially similar to the global coordinate system 150. The global coordinate system 550 is generally oriented with respect to a longitudinal axis or a main drive axis 552 of the CVT 500, for example with the $z_g$-axis coinciding with the main drive axis 552 about which the traction planets 508 are arranged. The $y_g$-axis is perpendicular to the main drive axis 552. The $x_g$-axis is perpendicular to the main drive axis 552. Each of the traction planets 508 has an axis of rotation, that is, a planet axis 506, which can be configured to tilt in the $y_g$-$z_g$ plane to thereby form a tilt angle 511 ($\gamma$), which is substantially similar to the tilt angle 118 (FIG. 1A). The planet axis 506 can be configured to follow a first guide 512 (depicted as a line in FIG. 3) on one end of the planet axis 506. The planet axis 506 can be configured to follow a second guide 514 (depicted as a line in FIG. 3) on a second end of the planet axis 506.

Referencing FIG. 4 specifically, in one embodiment, the first guide 512 and the second guide 514 can be formed on a first stator plate 516 and a second stator plate 518, respectively. Typically the planet axis 506 corresponds structurally to a planet axle, which can be operationally coupled to the first and second guides 512, 514, respectively. In some embodiments, the first and second stator plates 516, 518 are substantially disc-shaped bodies configured to operably couple to and to facilitate the support of the planet axis 506 during operation of the CVT 500. As an illustrative example for discussion purposes, the view depicted in FIG. 4 is of a projection of the stator plate 516 on the stator plate 518 in the $x_g$-$y_g$ plane. An angular displacement 520 of the stator plate 516 with respect to the stator plate 518 can be defined in the $x_g$-$y_g$ plane (the $z_g$-axis coinciding with the main drive axis 552 is perpendicular to the plane of the page of FIG. 4; the $x_g$-axis and the $y_g$-axis are each perpendicular to the main drive axis 552). The angular displacement 520 is sometimes referred to here as "angle $\beta$" or more succinctly as "$\beta$". A skew angle, such as the skew angle 120, can be defined for the CVT 500 in a substantially similar manner with respect to substantially similar coordinate systems as those used in reference to the CVT 100. Therefore, the skew angle 120 (ç) will be used here in reference to the CVT 500. A "zero-skew angle condition" is defined as that condition of the planet axis 506 when the skew angle 120 is zero (ç=0).

Figure 5C:
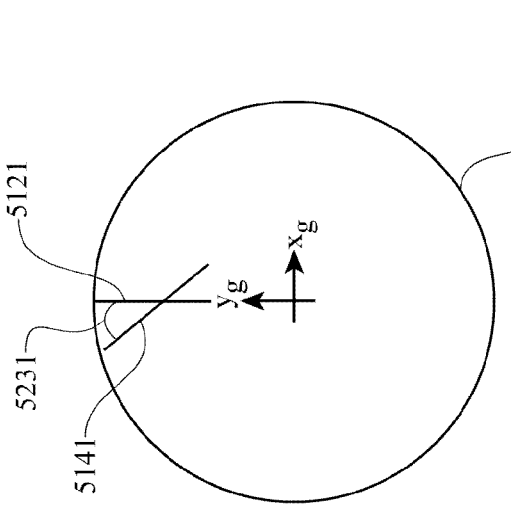
FIG. 5C is a schematic diagram of certain components that can be used with the CVT of FIG. 3.
Figure 5B:
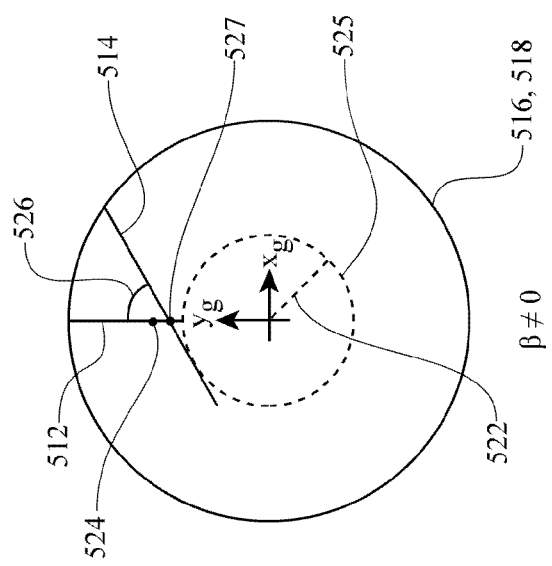
FIG. 5B is a schematic diagram of certain components of the CVT of FIG. 3.
Figure 5A:
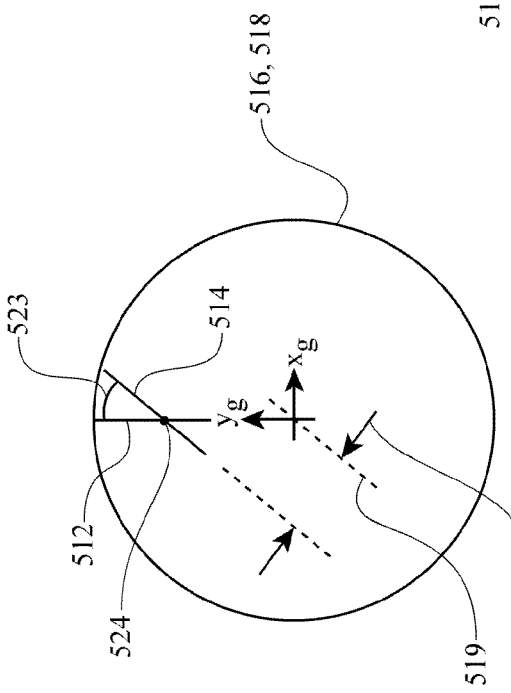
FIG. 5A is a schematic diagram of certain components of the CVT of FIG. 3.

Turning to FIG. 5A, the first and second guides 512, 514 are depicted again as projections in the $x_g$-$y_g$ plane. In some embodiments, the first guide 512 can be radially aligned with the origin of the $x_g$-$y_g$ plane; for example, the first guide 512 can generally coincide with the $y_g$-axis. In one embodiment, the second guide 514 can have an offset 522 from the origin of the $x_g$-$y_g$ plane. In one instance, the offset 522 can be generally defined as a linear offset relative to a construction line 519, which construction line 519 is parallel to the second guide 514 and passes through the origin of the $x_g$-$y_g$ plane when the stator 516 is located at a nominally zero angular displacement 520 ($\beta$). In a second instance, the second guide 514 can have a base angular reference position 523 ($\psi_o$) with respect to the first guide 512.

Referring to FIGS. 5A and 5B, the guides 512 and 514 are depicted again schematically. In one embodiment, the stator 518 can be rotated to a non-zero angular displacement 520 ($\beta$), which moves the guide 514 relative to the guide 512 (FIG. 5B). The offset 522 can be depicted as a radial offset 525 about the center of the stator 518 (that is, the origin of the $x_g$-$y_g$ plane). The guide 514 is tangent to the radial offset 525. Referencing FIG. 5A specifically, the base angular reference position 523 ($\psi_o$) with respect to the guide 512 is defined at a zero angular displacement 520 ($\beta$=0) and a zero tilt angle 511 ($\gamma$=0). The corresponding zero-skew angle condition for the planet axis 506 is depicted at a location 524, which lays at the intersection of the first and second guides 512 and 514 when viewed as projections in the $x_g$-$y_g$ plane. Referencing FIG. 5B specifically now, for a non-zero angular displacement 520 ($\beta$), the guide 514 has an angular position 526 ($\psi$) with respect to the guide 512. The corresponding zero-skew angle condition for the planet axis 506 is depicted at a location 527, which is located at the intersection between the guide 512 and the guide 514 when viewed as projections in the $x_g$-$y_g$ plane. The location 527 is an example of a zero skew angle condition for a non-zero angular displacement 520 ($\beta$) and a non-zero tilt angle 511 ($\gamma$). It should be noted that the guides 512, 514 illustrated here schematically can be provided, as will be illustrated below with regard to certain embodiments, as slots formed on stators 516, 518. In such instances, the guides 512, 514 can be representative of center lines that pass through a center of respective radial and offset slots. Schematically, as shown in FIGS. 5A-5C, a point of contact between a slot of a stator and a planet axle (or a roller on such a planet axle) of the ball 508 has been reduced to a point lying on one of the schematic guides 512, 514. However, in certain physical embodiments of the stator 516, 518, said point of contact does not lie on a radial line.

A non-zero skew angle 120 (ç) can be induced on the planet axis 506 by two events, occurring separately or in combination. One event is a change in the angular displacement 520 ($\beta$), and the other event is a change in the tilt angle 511 ($\gamma$). In one embodiment, the relationship between the angular displacement 520 ($\beta$) and the skew angle 120 (ç) for a constant tilt angle 511 ($\gamma$) depends on the geometry of the CVT 500, such as the length of the planet axis 506, and/or the radius of the stators 516, 518, among other factors. In one embodiment, the relationship between the angular displacement 520 ($\beta$) and the skew angle 120 (ç) for a constant tilt angle 511 ($\gamma$) is approximately expressed by the equation $\beta$=ç, for small angles. The relationship between the angular displacement 520 ($\beta$) and the angular position 526 ($\psi$) can depend on the geometry of the CVT 500 and the base angular reference position 523 ($\psi_o$), for example. In one embodiment, the angular position 526 ($\psi$) can be proportional to the angular displacement 520 ($\beta$), so that the relationship can be approximated by the relationship $\psi$=$\beta$+$\psi_o$, for small angles. For a constant angular displacement 520 ($\beta$), the skew angle 120 (ç) can also be related to the tilt angle 511 ($\gamma$). For example, the skew angle 120 (ç) can be related to the angular position 526 ($\psi$) and a change in the tilt angle 511 (delta $\gamma$) by the relationship tan(ç)=($\frac{1}{2}$*sin (delta $\gamma$)*tan($\psi$)). Applying the well known small angle approximation to said expression yields the equation ç=½*(delta γ)*ψ.

Figure 7:
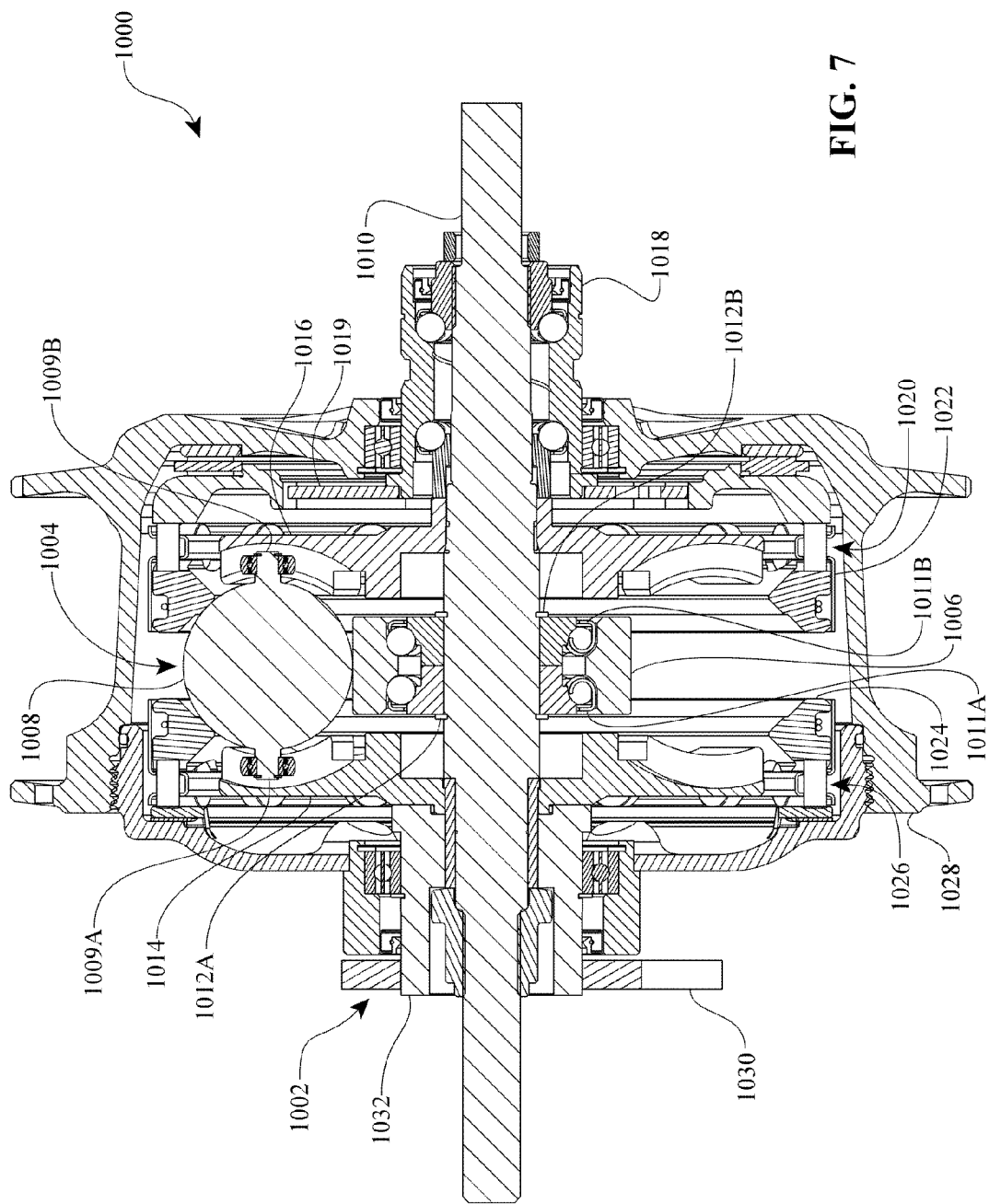
FIG. 7 is a cross-sectional view of an inventive embodiment of a CVT having a skew control system.

During operation of the CVT 500, the first and/or second stator plates 516, 518 can be rotated to the angular displacement 520 via a suitable control input (not shown in FIGS. 3-5C, but see FIG. 7 for an exemplary control input). In some embodiments, the first stator plate 516 can be configured to be substantially non-rotatable with respect to the main drive axis 552. The angular displacement 520 initially induces a skew angle 120 on the planet axis 506. As previously discussed, the skew angle 120 motivates a change in the tilt angle 511 (γ) of the planet axis 506. As the planet axis 506 tilts, the ends of the planet axis 506 follow the first and second guides 512, 514. The guides 512, 514 are configured so that the skew angle 120 decreases in magnitude as the planet axis 506 tilts towards an equilibrium condition, which, in once instance, corresponds to a zero-skew angle condition. Once the planet axis 506 reaches the tilt angle 511 (γ), which generally coincides with a zero-skew angle condition, the tilting of the planet axis 506 stops. In one embodiment, the tilt angle 511 (γ) of the planet axis 506 depends, at least in part, on the angular displacement 520 (β). In some embodiments, the relationship of the tilt angle 511 (γ) and the angular displacement 520 (β) is unique, so that each value of the angular displacement 520 (β) corresponds to a value of the tilt angle 511 (γ) at which the CVT 500 can operate at an equilibrium speed ratio condition.

Upon reaching the equilibrium condition, each of the planet axes 506 is substantially at a zero-skew angle condition. Since the planet axes 506, and consequently the traction planets 508, of the CVT 500 are independently coupled to the stators 516, 518, each of the traction planets 508 and the planet axes 506 can independently self stabilize at the equilibrium speed ratio condition. To elucidate further, when the tilt angle 511 (γ) of one of the planet axes 506 moves away from the equilibrium condition (for example, due to an outside influence or a perturbation in the operating condition), the ends of the planet axis 506 follow the guides 512, 514. As previously discussed, a skew condition is induced on the planet axis 506, and therefore, the planet axis 506 tends to tilt toward the tilt angle 511 (γ) that generally corresponds to the equilibrium condition for a given angular displacement 520 (β). The guides 512, 514 independently guide the movement or tilting of the planet axes 506. Therefore, the movement or tilting of one of the planet axes 506 can occur substantially independently from the other planet axles of the CVT 500.

The configuration of the guides 512, 514 affects the ability of the CVT 500 to stabilize at an equilibrium condition. For a given direction of rotation of the first traction ring 504, the arrangement of the guides 512, 514 depicted in FIG. 5A results in stable operation of the CVT 500. For example, a desired speed ratio can be maintained for the CVT 500 that corresponds to the angular displacement 520 (β). Adhering to the sign convention generally defined in reference to FIGS. 1A-1F, it can be shown that, for a given angular displacement 520 (β), a positive change in the tilt angle 511 (γ) induces a positive change in the skew angle and vice versa. Therefore, each planet axis 506 can operate stably when provided with the relative arrangement of the guides 512, 514 depicted in FIG. 5A.

Referencing FIG. 5C now, in one embodiment, a guide 5121 and a guide 5141 can be substantially similar in function to the guides 512, 514; however, the guides 5121, 5141 are arranged with a base angular reference position 5231 that is substantially opposite in direction (that is, the opposite sign) to the base angular reference position 523 ($\psi_o$) with respect to the $x_g$-$y_g$ plane. Assuming the equivalent direction of rotation of the first ring 504, and consequently the direction of rotation of the traction planet 508, the arrangement of the guides 5121, 5141 could in at least some instances result in an unstable operation of the CVT 500. For example, a desired speed ratio corresponding to the angular displacement 520 (β) cannot be maintained for the CVT 500 because a positive change in the tilt angle 511 (γ) induces a negative skew angle and vice versa. Therefore a perturbation in operation that tilts one of the planet axes 506 will cause the planet axis 506 to tilt until limited by, for example, a mechanical stop (not shown).

Figure 6A:
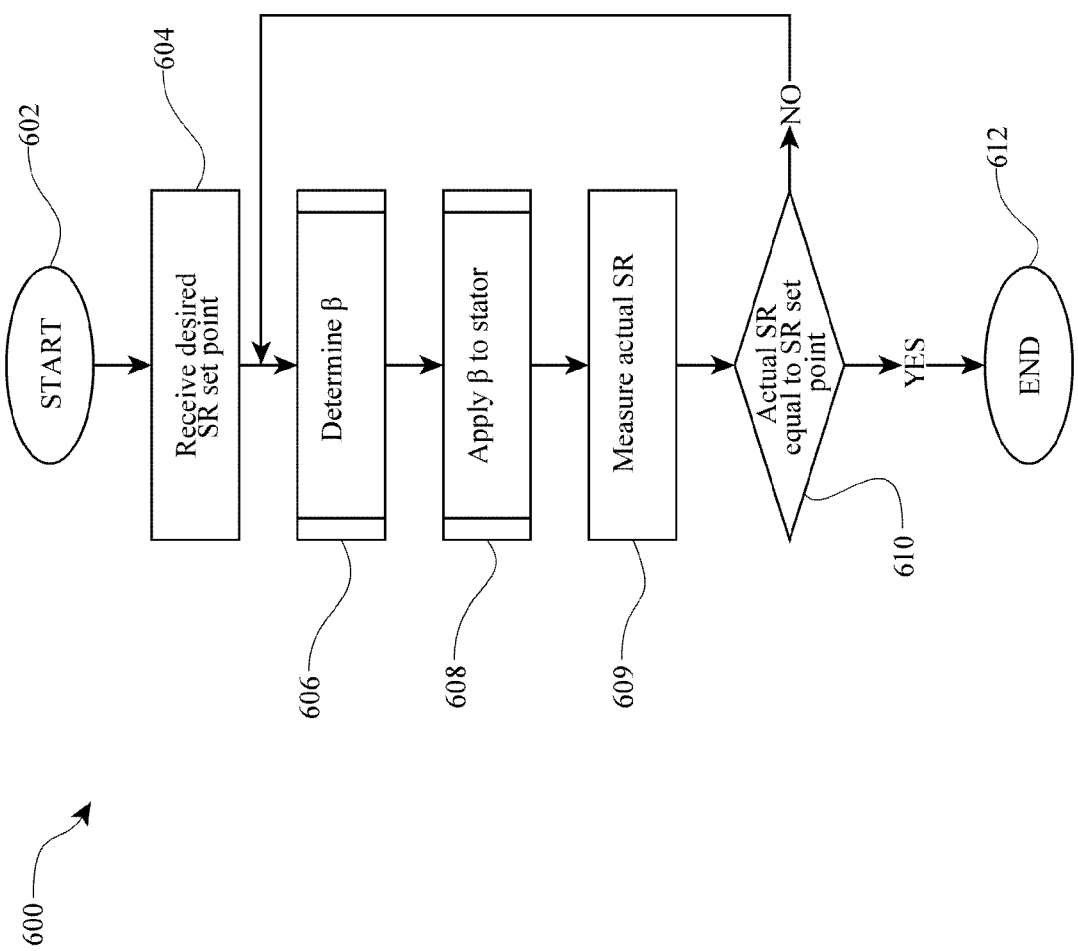
FIG. 6A is a flow chart of a skew-based control process that can be used with the CVT of FIG. 3.

Referring now to FIG. 6A, in one embodiment a skew-based control process 600 can be implemented on, for example, a microprocessor in communication with power electronics hardware coupled to the CVT 500. The skew-based control process 600 begins at a state 602. The skew-based control process 600 then proceeds to a state 604, wherein a desired speed ratio (SR) set point of the CVT 500 is received. The skew-based control process 600 continues to a state 606 where the angular displacement 520 of, for example, the first stator 516 is determined. Next, the skew-based control process 600 moves to an actuator subprocess 608 where the angular displacement 520 is applied to the stator 516, for example. Upon completion of the actuator subprocess 608, the skew-based control process 600 proceeds to a state 609 where the actual SR of the CVT 500 is measured. In one embodiment, the actual SR of the CVT 500 can be determined by measuring the speed of, for example, the traction rings 502 and 504, or any other component indicative of input speed and output speed to the CVT 500. In some embodiments, the actual SR can be calculated based at least in part on a target output speed condition or based at least in part on a target input speed condition. In other embodiments, the actual SR of the CVT 500 can be determined by measuring the tilt angle of the planet axis 506. In yet other embodiments, the actual SR of the CVT 500 can be determined by measuring an actual torque ratio of the CVT 500. The actual torque ratio of the CVT 500 can be determined by measuring the torque of, for example the traction rings 502 and 504, or any other component indicative of input torque and output torque to the CVT 500. Next, the skew-based control process 600 proceeds to a decision state 610 where the measured speed ratio is compared to the desired speed ratio set point to thereby form a comparison value. If the measured speed ratio is not equal to the desired speed ratio set point, the skew-based control process 600 returns to the state 606. If the measured speed ratio is equal to the desired speed ratio set point, the skew-based control process 600 proceeds to an end state 612. In some embodiments, the skew-based control process 600 is configured to operate in an open loop manner; in such a case, the states 609 and 610 are not included in the subprocess 608.

Figure 6B:
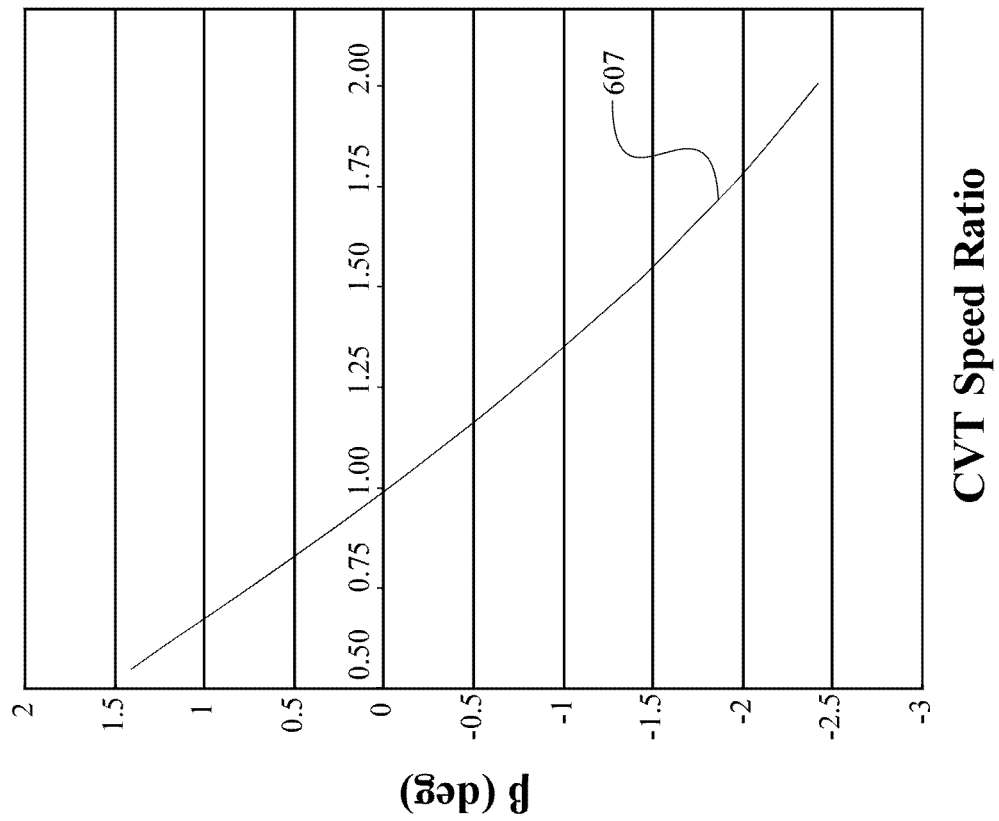
FIG. 6B is a chart representing a look-up table that can be used in a subprocess of the skew-based control process of FIG. 6A.

Referring to FIG. 6B, in one embodiment the state 606 can use a look-up table that can be represented by a curve 607. The curve 607 depicts an exemplary relationship between the angular displacement 520 (β) and the speed ratio of, for example, the CVT 500. The curve 607 can be expressed by the equation y=Ax$^2$−Bx+C, where y is the angular displacement 520 (β) and x is the speed ratio. In one embodiment, the values of A, B, and C are 0.5962, −4.1645, and 3.536, respectively. In some embodiments, the values of A, B, and C are 0.5304, −4.0838, and 3.507, respectively. In other embodiments, the values of A, B, and C are related to the dimensions and geometry of the CVT 500, for example, the position of guides 512 and 514 on the stators 516 and 518, the length of the planet axis 506, and dimensions of the traction rings 502 and 504, among other things. In some embodiments, that actuator subprocess 608 is configured to operate in an open loop manner; in such a case, the states 619 and 620 are not included in the subprocess 608.

Figure 6C:
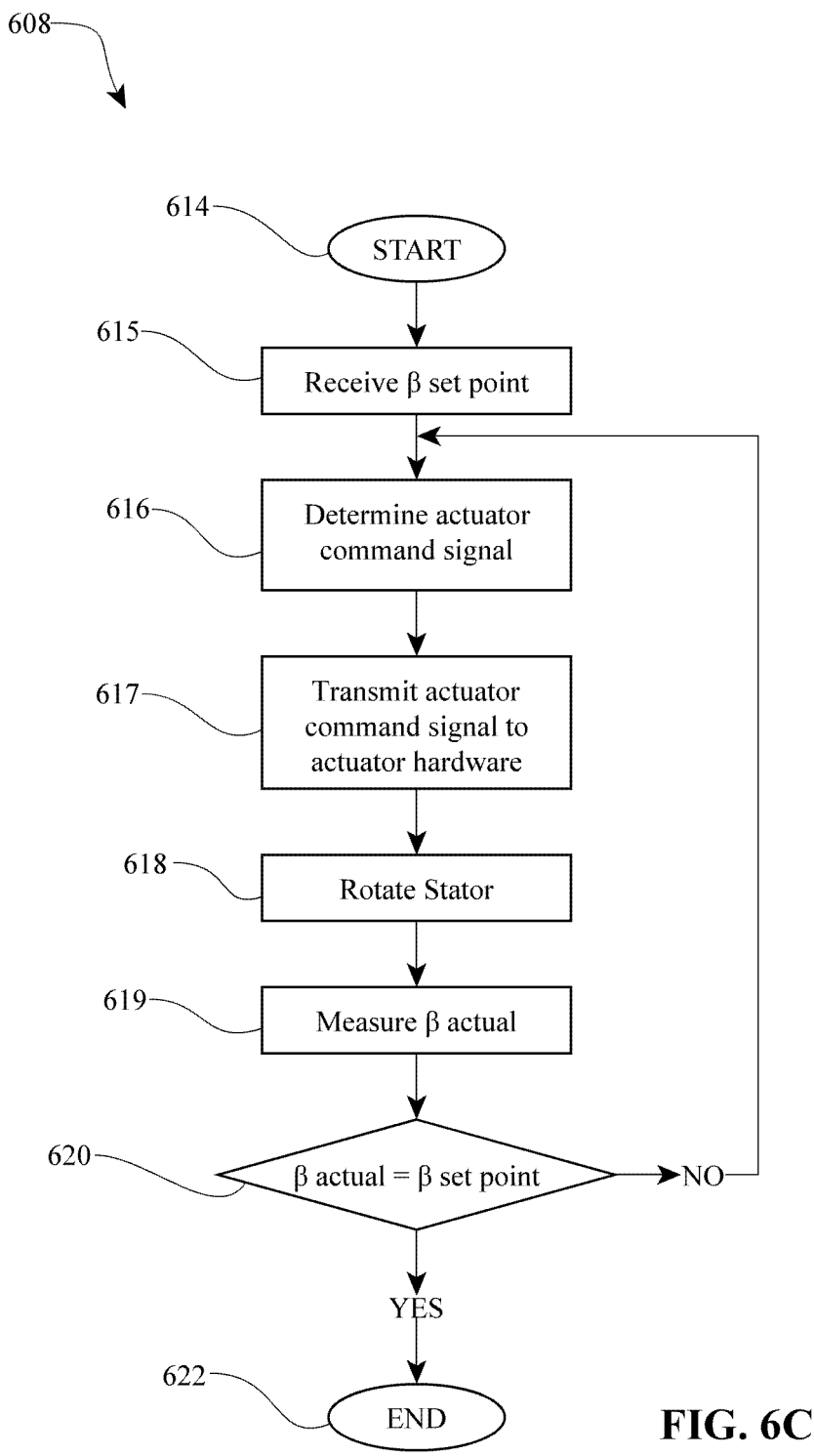
FIG. 6C is a flow chart of an actuator subprocess that can be used with the skew-based control process of FIG. 6A.

Referring to FIG. 6C, in one embodiment the actuator subprocess 608 can begin at a state 614 and proceed to a state 615 where a set point for the angular displacement 520 (β) is received. The actuator subprocess 608 proceeds to a state 616 where an actuator command signal is determined based at least in part on the angular displacement 520 (β). In one embodiment, a look-up table can be used to convert the angular displacement 520 (β) set point to an actuator command signal. In some embodiments, the actuator command signal can be a voltage or a current. In other embodiments, the actuator command signal can be a change in the position of a cable or a linkage. In some embodiments, an algorithm can be used to derive the actuator command signal from the angular displacement 520 (β) set point. Next, the actuator subprocess 608 proceeds to a state 617 where the actuator command signal is sent to an actuator and associated hardware. In one embodiment, a standard serial communication protocol can be used to send the command signal to the actuator hardware. In some embodiments, a cable or a linkage can be used to transmit the command signal to the actuator hardware. The actuator subprocess 608 then passes to a state 618 where the stator, for example the stator 516, is rotated. Next, the actuator subprocess 608 passes to a state 619 where the angular displacement 520 (β) is measured. The actuator subprocess 608 then proceeds to a decision state 620 where the measured angular displacement 520 (β) is compared to the set point for the angular displacement 520 (β). If the measured angular displacement 520 (β) is not equal to the angular displacement 520 (β) set point, the actuator subprocess 608 returns to the state 616. If the measured angular displacement 520 (β) is equal to the angular displacement 520 (β) set point, the actuator subprocess 608 then ends at a state 622, wherein the skew-based control process 600 can continue at state 609 as described above with reference to FIG. 6A. In some embodiments, the actuator subprocess 608 is configured to operate in an open loop manner; in such a case, the states 619 and 620 are not included in the subprocess 608.

Passing now to FIG. 7, in one embodiment a CVT 1000 can include a skew-based control system 1002 operably coupled to a variator assembly 1004. In one embodiment, the variator assembly 1004 includes a traction sun 1006 located radially inward of, and in contact with, a number of substantially spherical traction planets 1008. The traction sun 1006 can be configured to rotate about a main axle 1010 by providing bearings 1011. In one embodiment, the traction sun 1006 is fixed axially with respect to the main axle 1010 with clips 1012 that are coupled to the main axle 1010 and to the bearings 1011.

In one embodiment, each traction planet 1008 is provided with a set of planet axles 1009A and 1009B that are configured to provide a tiltable axis of rotation for their respective traction planet 1008. The planet axles 1009A and 1009B can be configured to rotate with the traction planet 1008. The planet axles 1009A and 1009B are substantially aligned with a central axis the traction planet 1008. In other embodiments, the traction planet 1008 can be configured to have a central bore, and the traction planet 1008 can be operably coupled to a planet axle (not shown) via bearings, so that the planet axle is configured to be substantially non-rotatable. Each of the traction planets 1008 are operably coupled to a first stator 1014 and a second stator 1016. The first and second stators 1014, 1016 can be arranged coaxial with the main axle 1010.

In one embodiment of the CVT 1000, an input driver 1018 can be arranged coaxial with the main axle 1010. The input driver 1018 can be configured to receive an input power from, for example, a sprocket, a pulley, or other suitable coupling. In one embodiment, the input driver 1018 is coupled to a torsion plate 1019 that is coupled to a first axial force generator assembly 1020. The axial force generator assembly 1020 is operably coupled to a first traction ring 1022 that can be substantially similar in function to the traction ring 102 (FIG. 1A). The first traction ring 1022 is configured to contact each of the traction planets 1008. A second traction ring 1024 is configured to contact each of the traction planets 1008. The second traction ring 1024 can be substantially similar in function to the traction ring 104 (FIG. 1A). In one embodiment, the second traction ring 1024 is coupled to a second axial force generator assembly 1026. The second axial force generator assembly 1026 can be substantially similar to the first axial force generator assembly 1020. In certain embodiments, the axial force generator assemblies 1020 and 1026 can be substantially similar to the clamping force generator mechanisms generally described in Patent Cooperation Treaty Application PCT/US2007/023315.

During operation of CVT 1000, an input power can be transferred to the input driver 1018 via, for example, a sprocket. The input driver 1018 can transfer power to the first axial force generator 1020 via the torsion plate 1019. The first axial force generator 1020 can transfer power to the traction planets 1008 via a traction or friction interface between the first traction ring 1022 and the each of the traction planets 1008. The traction planets 1008 deliver the power to a hub shell 1028 via the second traction ring 1024 and the second axial force generator 1026. A shift in the ratio of input speed to output speed, and consequently, a shift in the ratio of input torque to output torque, is accomplished by tilting the rotational axis of the traction planets 1008. In one embodiment, the tilting of the rotational axis of the traction planets 1008 is accomplished by rotating the first stator 1014, which can be substantially similar to the first stator 516 (FIGS. 4-5C).

Figure 8:
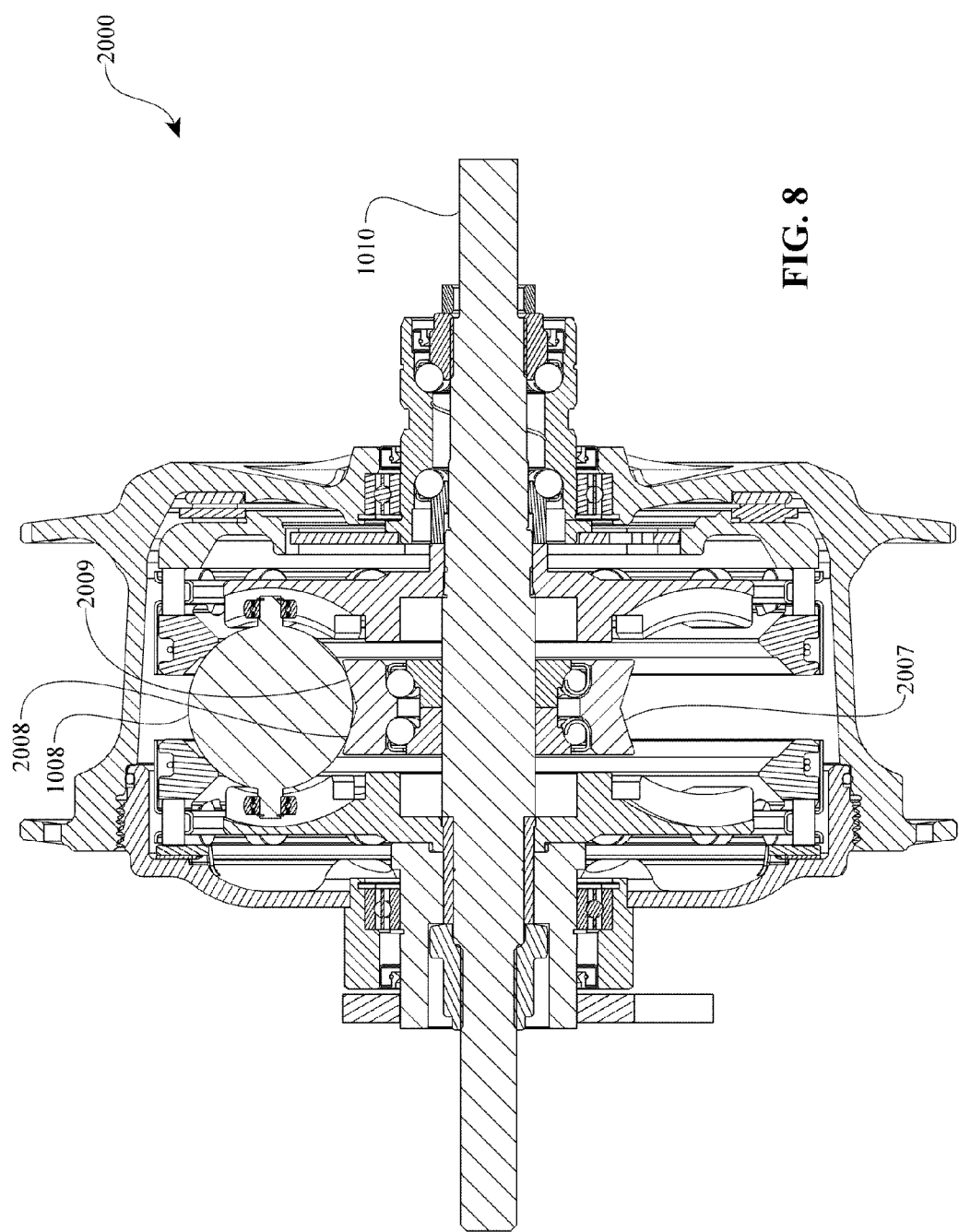
FIG. 8 is a cross-sectional view of another inventive embodiment of a CVT having a skew control system.

Turning now to FIG. 8, in one embodiment a CVT 2000 can be substantially similar to the CVT 1000. For description purposes, only the differences between the CVT 1000 and the CVT 2000 will be described. In one embodiment, the CVT 2000 includes a traction sun 2007 located radially inward of, and in contact with each of the traction planets 1008. The traction sun 2007 is a substantially cylindrical body that can be formed with a v-shaped profile about the outer periphery of the body when viewed in cross-section in the plane of the page of FIG. 8. The traction sun 2007 can be configured to contact each of the traction planets 1008 at a first and a second location 2008 and 2009, respectively. The contact-centered coordinate systems and the kinematic relationships discussed in reference to contact 3 (FIGS. 1A-1F) can be similarly applied to the contact locations 2008 and 2009. During operation of the CVT 2000, the traction sun 2007 is substantially axially fixed by balancing axial forces at contact locations 2008 and 2009. Further, in some embodiments, the first and second rings 1022, 1024 are configured to provide sufficient radial kinematic constraint to the planets 1008; in such embodiments, the traction sun 2007 and bearings 1011 can be removed from various embodiments of CVTs discussed here.

Figure 9:
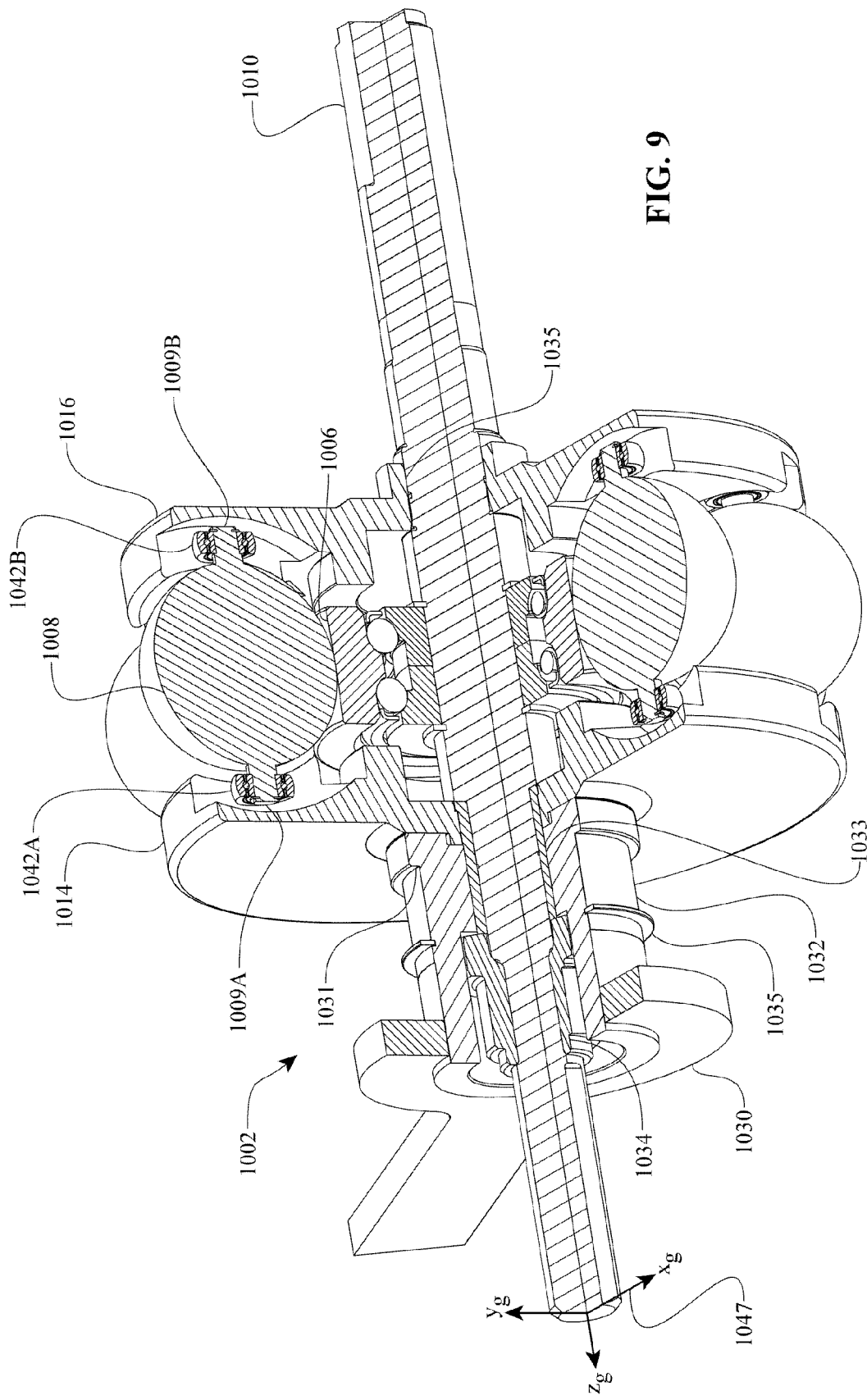
FIG. 9 is a cross-sectioned, partial perspective view of the CVT of FIG. 7.

Referring to FIG. 9, in one embodiment the skew-based control system 1002 can include a lever arm 1030 that can be configured to couple to a stator driver 1032. The stator driver 1032 can be coupled to the first stator plate 1014 via, for example, a number of dowels or other suitable fasteners or couplings (not shown). In one embodiment the stator driver 1032 can be a generally hollow cylindrical body. The stator driver 1032 can be provided on one end with a flange 1031 that is configured to facilitate the coupling of the stator driver 1032 to the first stator plate 1014. The stator driver 1032 can be provided with a groove that can be configured to receive a clip 1035 for retaining a bearing, for example.

In one embodiment, the first stator plate 1014 can be configured to rotate with respect to the main axle 1010. For example, a bushing 1033 can couple to the first stator plate 1014 and to the stator driver 1032. The bushing 1033 can be arranged coaxial about the main axle 1010. In one embodiment, a nut 1034 can be configured to cooperate with the main axle 1010 to axially retain the bushing 1033. In some embodiments, the second stator plate 1016 can be coupled to the main axle 1010 via a spline 1035, or other suitable torque transferring coupling, so that the second stator plate 1016 is substantially non-rotatable with respect to the main axle 1010.

During operation of the CVT 1000, the lever arm 1030 can be rotated about the main axle 1010 to thereby generate an angular rotation of the stator driver 1032 about the main axle 1010. The lever arm 1030 can be rotated manually via a linkage or a cable (not shown). In some embodiments, the lever arm 1030 can be operably coupled to an electronic actuator (not shown) such as a DC motor or a servo actuator. In some embodiments, the lever arm 1030 can be operably coupled to a hydraulic actuator (not shown). In other embodiments, the stator driver 1032 can be coupled directly to an actuator such as any of those aforementioned. The angular rotation of the stator driver 1032 imparts an angular displacement ($\beta$) to the first stator plate 1014 with respect to the second stator plate 1016. As described earlier in reference to the CVT 500, the angular rotation of the first stator plate 1014 with respect to the second stator plate 1016 can facilitate the tilting of the rotational axis of the traction planets 1008.

Figure 10:
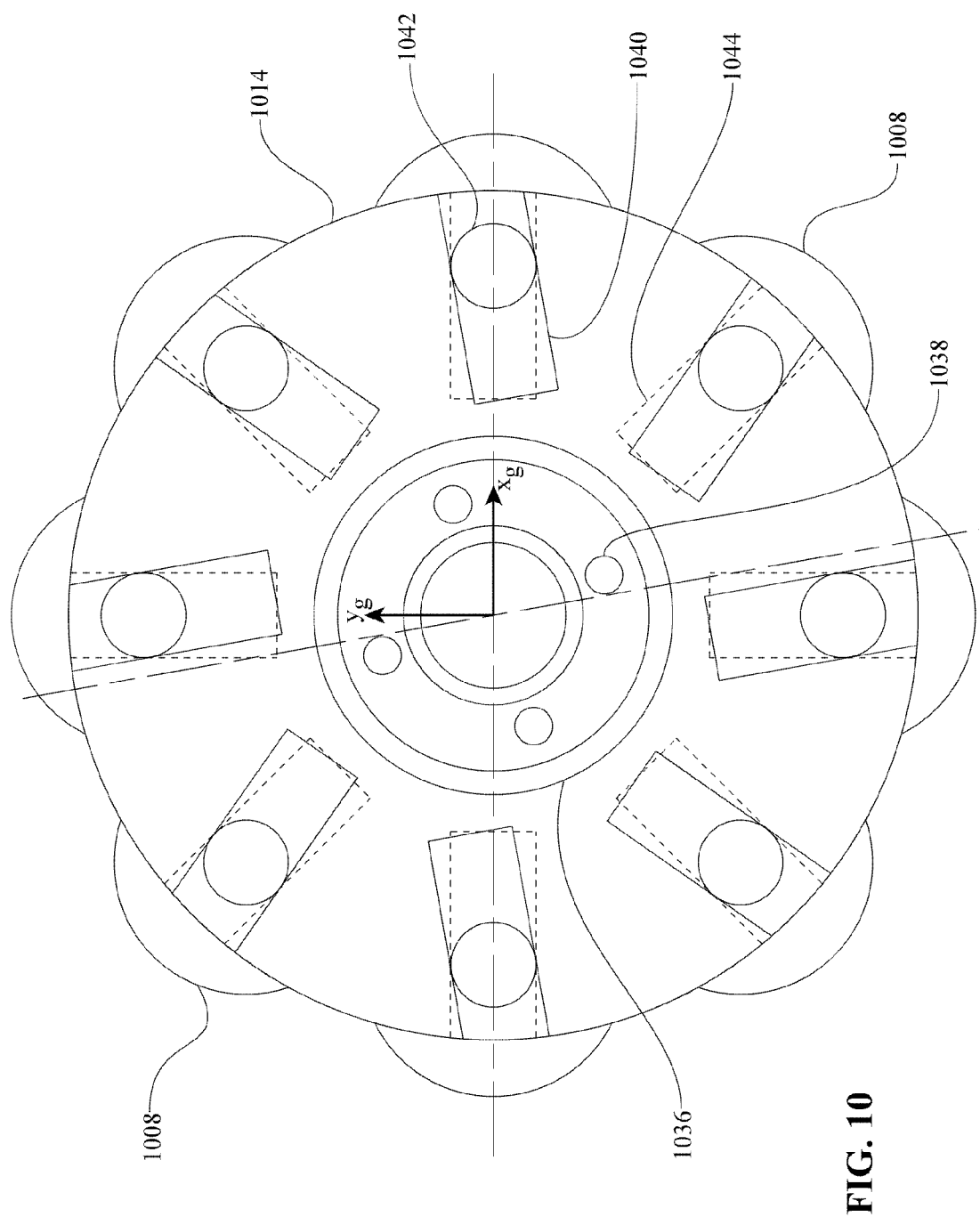
FIG. 10 is a plan view depicting certain components of the CVT of FIG. 7.

Turning now to FIGS. 10-13, in one embodiment the first stator plate 1014 can be a substantially disc-shaped body having a central bore. In some embodiments, the first stator plate 1014 can be provided with a hub 1036 formed about the central bore. The hub 1036 can be provided with a number of holes 1038 that can facilitate the coupling of the first stator plate 1014 to the stator driver 1032. A number of radially offset slots 1040 can be formed on a face of the first stator plate 1014. The radially offset slots 1040 can be configured to facilitate support of the traction planets 1008 via contact with, for example, a number of rollers 1042 (see FIG. 9) that are operably coupled to each of the ball axles 1009. The second stator plate 1016 can be provided with a number of radial slots 1044. The radial slots 1044 can be configured to couple to the rollers 1042. FIG. 10 depicts an exemplary arrangement of the radially offset slots 1040 with respect to the radial slots 1044. For discussion purposes, the global coordinates 1047 (FIG. 9) are applied to the CVT 1000. Consequently, the radial slots 1044 can be viewed as projections on the first stator plate 1014 in the $x_g$-$y_g$ plane. The radial slots 1044 are shown with dashed lines in FIG. 10.

Referencing FIGS. 11A and 11B specifically, in one embodiment, the radially offset slots 1040 and the radial slots 1044 have a width 1046. The width 1046 can be sized to accommodate the outer diameter of the roller 1042. In the embodiment illustrated in FIG. 10, the radial slots 1044 are arranged about the second stator plate 1016 so that the radially offset slots 1040 do not align (that is, are offset) with the radial slots 1044, as seen in the projection of the radially offset slots 1040 and the radial slots 1044 onto the $x_g$-$y_g$ plane. The amount of linear offset 1048 is depicted in FIG. 11 with reliance on the section lines A-A and B-B. The section line A-A substantially bisects one of the radially offset slots 1040, wherein the bisection is substantially half of the width 1046. The section line B-B substantially aligns with the centerline of the first stator plate 1014. The section line B-B is a line that is perpendicular to the main drive axis $z_g$ (FIG. 9). The section line A-A is a line that is parallel to the section line B-B. Alternatively, the radially offset slots 1040 can be shown to have an angular offset 1049 by defining a construction line 1050 and a centerline 1051. The centerline 1051 can be constructed with respect to a diameter of the first stator plate 1014. The construction line 1050 is shown for convenience to be at a radial location coinciding with the center of the planet axle 1009 when the planet axle 1009 is at a tilt angle substantially equal to zero. The angular offset 1049 can be defined as the angular displacement between the centerline 1051 and the middle of the radially offset slots 1040 lying along the construction line 1050, wherein the middle of the radially offset slot 1040 is substantially half of the width 1046. In one embodiment, the angular offset 1049 is in the range of about 0 degrees to 45-degrees. In some embodiments, the angular offset 1049 can be between 5- and 20-degrees, and preferably 8-, 9-, 10-, 11- or 12-degrees.

Referring now to FIGS. 12 and 13, in one embodiment the first stator plate 1014 can be provided with a shift stop extension 1052 arranged about the central bore. The first stator plate 1014 can be provided with a generally toroidal clearance cut 1054. The clearance cut 1054 can be formed on the face of the first stator plate 1014. The clearance cut 1054 can have a generally curved profile when viewed in the plane of the FIG. 13. Likewise, a valley 1041 and/or a wall 1043 of the radially offset slot 1040 can be provided with a generally curved profile when viewed in the plane of FIG. 12. During operation of the CVT 1000, the radially offset slots 1040 guide the rollers 1042. The shift stop extension 1052 can provide a mechanical limit to the path of the rollers 1042 in the radially offset slots 1040. In some embodiments, the shift stop extension 1052 can be formed on a radially outward periphery of the first stator plate 1014.

Turning now to FIGS. 14 and 15, in one embodiment the second stator plate 1016 can be a generally disc-shaped body having a central bore 1056. The central bore 1056 can be configured to facilitate the coupling of the second stator plate 1016 to the main axle 1010 with, for instance, a spline, knurl, or weld. The radial slots 1044 can be arranged angularly about the central bore 1056. In some embodiments, the radial slots 1044 can extend on the second stator plate 1016 from near, or in the vicinity of, the periphery of the stator plate 1016 toward the central bore 1056. The radial slot 1044 can be provided with a curved profile when viewed in the plane of FIG. 15. In one embodiment, the second stator plate 1016 can be provided with a shift stop extension 1057. The shift stop extension 1057 can be formed radially about, and extend axially from, the central bore 1056. The shift stop extension 1057 can be configured substantially similar to the shift stop extension 1052.

Turning now to FIGS. 16 and 17, in one embodiment the planet axle 1009 can be provided with a groove 1070 configured to receive a clip 1072. The clip 1072 can facilitate the coupling of the roller 1042 to the planet axle 1009. In one embodiment, a surface 1074 can be provided on the planet axle 1009 to provide support for a bearing 1076. The bearing 1076 can be configured to couple to an inner diameter of the roller 1042. In some embodiments, the bearing 1076 is pressed into the roller 1042. In other embodiments, the roller 1042 can be configured to receive a ball bearing 1077. A bearing surface 1078 can be provided on the planet axle 1009 for facilitating the coupling of the bearing 1077 to the planet axle 1009.

Referring still to FIGS. 16 and 17, in one embodiment the roller 1042 is a generally cylindrical body having a central bore. The central bore can be configured to receive the bearing 1076 or the bearing 1077. The roller 1042 can be provided with a crowned outer circumference of the cylindrical body. The crowned outer circumference is configured to facilitate the coupling of the planet axle 1009 to the first and the second stator plates 1014 and 1016.

It should be noted that the description above has provided dimensions for certain components or subassemblies. The mentioned dimensions, or ranges of dimensions, are provided in order to comply as best as possible with certain legal requirements, such as best mode. However, the scope of the inventions described herein are to be determined solely by the language of the claims, and consequently, none of the mentioned dimensions is to be considered limiting on the inventive embodiments, except in so far as any one claim makes a specified dimension, or range of thereof, a feature of the claim.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What we claim is:

1. A method of supporting a plurality of spherical traction planets of a continuously variable transmission (CVT), each spherical traction planet having a tiltable axis of rotation, the method comprising the steps of:

providing a first stator plate having a plurality of radially offset slots and a substantially disc shaped body, the first stator plate having a center arranged coaxially with and perpendicular to a main drive axis of the CVT, the radially offset slots arranged angularly about the center of the first stator plate;

operably coupling each of the spherical traction planets to the first stator plate;

providing a second stator plate having a plurality of radial slots, the radial slots arranged angularly about a center of the second stator plate; and operably coupling the spherical traction planets to the second stator plate.

2. The method of claim 1, further comprising rotating the first stator plate relative to the second stator plate.

3. The method of claim 2, wherein the first stator plate is substantially non-rotatable about the main drive axis of the CVT.

4. The method of claim 2, wherein the second stator plate is substantially non-rotatable about the main drive axis of the CVT.

5. The method of claim 1, further comprising locating a shift stop extension on the first stator plate, the shift stop extension arranged about the center of the first stator plate.

6. The method of claim 5, further comprising locating the shift stop extension radially inward of the radially offset slots.

7. The method of claim 5, further comprising locating the shift stop extension radially outward of the radially offset slots.

8. The method of claim 1, further comprising forming the plurality of radially offset slots to have a curved profile.

* * * * *

UNITED STATES PATENT AND TRADEMARK OFFICE
CERTIFICATE OF CORRECTION

PATENT NO. : 8,852,050 B2  Page 1 of 1
APPLICATION NO. : 13/924304
DATED : October 7, 2014
INVENTOR(S) : Fernand A. Thomassy It is certified that error appears in the above-identified patent and that said Letters Patent is hereby corrected as shown below:

In the Specification

In column 1 at line 39 (approx.), change "tillable" to --tiltable--.

In column 6 at line 46, change "co." to --ω.--.

Signed and Sealed this
Twenty-eighth Day of July, 2015

Michelle K. Lee
*Director of the United States Patent and Trademark Office*